United States Patent
Su et al.

(10) Patent No.: US 10,978,741 B2
(45) Date of Patent: Apr. 13, 2021

(54) NON-AQUEOUS ELECTROLYTES FOR ELECTROCHEMICAL CELLS

(71) Applicant: UChicago Argonne, LLC, Chicago, IL (US)

(72) Inventors: Chi Cheung Su, Westmont, IL (US); Khalil Amine, Oakbrook, IL (US); Meinan He, Willowbrook, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 2 days.

(21) Appl. No.: 16/266,496

(22) Filed: Feb. 4, 2019

(65) Prior Publication Data

US 2020/0251781 A1    Aug. 6, 2020

(51) Int. Cl.
    *H01M 10/0568* (2010.01)
    *H01M 10/0567* (2010.01)
    *H01M 10/0569* (2010.01)
    *H01M 10/0525* (2010.01)

(52) U.S. Cl.
    CPC ...  *H01M 10/0568* (2013.01); *H01M 10/0567* (2013.01); *H01M 10/0569* (2013.01); *H01M 10/0525* (2013.01); *H01M 2300/0025* (2013.01)

(58) Field of Classification Search
    CPC ......... H01M 10/0525; H01M 10/0567; H01M 10/0568; H01M 10/0569; H01M 2300/0025
    See application file for complete search history.

(56) References Cited

U.S. PATENT DOCUMENTS

| | | | |
|---|---|---|---|
| 9,337,487 B2 | 5/2016 | Sun et al. | |
| 9,373,867 B2 | 6/2016 | Kawasaki et al. | |
| 9,520,593 B2 | 12/2016 | Sun et al. | |
| 2011/0008680 A1* | 1/2011 | Muldoon | C07C 311/48 429/325 |
| 2013/0071731 A1* | 3/2013 | Tokuda | H01M 10/0564 429/200 |
| 2016/0049647 A1 | 2/2016 | Park et al. | |
| 2016/0049648 A1 | 2/2016 | Noh et al. | |
| 2016/0049649 A1 | 2/2016 | Noh et al. | |
| 2016/0049650 A1 | 2/2016 | Noh et al. | |
| 2016/0156030 A1 | 6/2016 | Sun et al. | |
| 2016/0190573 A1 | 6/2016 | Sun et al. | |
| 2016/0218350 A1 | 7/2016 | Noh et al. | |

* cited by examiner

*Primary Examiner* — Osei K Amponsah
(74) *Attorney, Agent, or Firm* — Foley & Lardner LLP

(57) ABSTRACT

A non-aqueous electrolyte comprising a salt, a non-aqueous solvent, and a compound of Formula (I), (II), or (III), where E is —S(O)— or S(O)$_2$—:

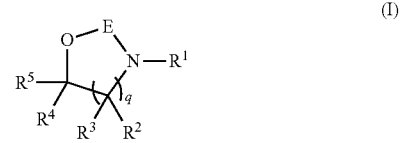

(I)

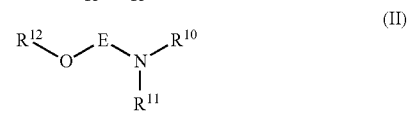

(II)

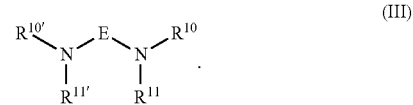

(III)

20 Claims, 4 Drawing Sheets

NON-AQUEOUS ELECTROLYTES FOR ELECTROCHEMICAL CELLS

GOVERNMENT RIGHTS

The United States Government has rights in this invention pursuant to Contract No. DE-AC02-06CH11357 between the United States Government and UChicago Argonne, LLC, representing Argonne National Laboratory.

FIELD

The technology generally relates to lithium rechargeable batteries. More particularly the technology relates to the use of organosulfamate compounds in electrochemical cells and batteries.

BACKGROUND

Lithium-ion batteries (LIBs) are used widely as energy sources for portable electronics and hybrid electric vehicles. To realize the application of pure electric vehicles, LIBs with high energy density are crucial, and, thus, novel anode and cathode materials with high energy density are actively pursued. For example, new high capacity cathode materials with higher operating voltage, such as $Li_2FeSiO_4$ and $LiNi_xMn_yCo_zO_2$ have been actively studied.

However, it has been found that battery performance fades rapidly at higher and higher operating potentials due, at least in part, to the parasitic reactions between electrolytes and the cathode surface. Owing to its outstanding solid-electrolyte interface ("SEI") forming properties, the cyclic carbonate, ethylene carbonate ("EC"), has been an essential electrolyte solvent in conventional electrolyte systems. However, the high melting point (36° C.) of EC limits its application in low temperature applications. More importantly, the low anodic stability of EC leads to severe electrolyte decomposition in high-voltage lithium-ion cells. Other potential solvents such as propylene carbonate ("PC") have a lower melting point (−49° C.), but they fail to provide satisfactory passivation of graphite due to co-intercalation with lithium cation into the crystal structure of graphite that is typically used in the electrodes.

SUMMARY

In one aspect, a non-aqueous electrolyte includes a salt; and a compound of Formula (I), Formula (II), Formula (III), or a mixture of any two or more thereof. In the electrolyte the Formulae are:

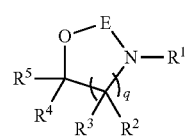
(I)

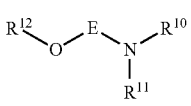
(II)

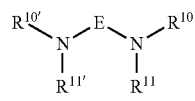
(III)

wherein:

E is —S(O)— or —S(O)$_2$—;

$R^1$ is H, F, alkyl, alkenyl, alkynyl, aryl, aralkyl, heteroaryl, heteroarylalkyl, heterocyclylalkyl, heterocyclylalkyl, cycloalkyl, cycloalkylalkyl, silyl, siloxy, an ether, a polyalkylene glycol, —CFH$_2$, —CF$_2$H, —CF$_3$, —CF$_2$CF$_3$, —CF$_2$CHF$_2$, —CF$_2$CH$_3$, —CF$_2$CH$_2$F, —CHFCF$_3$, —CHFCHF$_2$, —CHFCH$_3$, —CHFCH$_2$F, —CH$_2$CF$_3$, —CH$_2$CHF$_2$, —CH$_2$CH$_2$F, —CF(CF$_3$)$_2$, or —CH(CF$_3$)$_2$;

$R^2$, $R^3$, $R^4$, and $R^5$ are individually H, F, alkyl, alkenyl, alkynyl, aryl, aralkyl, heteroaryl, heteroarylalkyl, heterocyclylalkyl, heterocyclylalkyl, cycloalkyl, cycloalkylalkyl, silyl, siloxy, an ether, a polyalkylene glycol, —CFH$_2$, —CF$_2$H, —CF$_3$, —CF$_2$CF$_3$, —CF$_2$CHF$_2$, —CF$_2$CH$_3$, —CF$_2$CH$_2$F, —CHFCF$_3$, —CHFCHF$_2$, —CHFCH$_3$, —CHFCH$_2$F, —CH$_2$CF$_3$, —CH$_2$CHF$_2$, —CH$_2$CH$_2$F, -efsCF(CF$_3$)$_2$, or —CH(CF$_3$)$_2$;

$R^6$ is H, —C(O)R$^7$, alkyl, aryl, aralkyl, heteroaryl, heterocyclyl, alkenyl, alkynyl, silyl, siloxy, an ether, a polyalkylene glycol, —CFH$_2$, —CF$_2$H, —CF$_3$, —CF$_2$CF$_3$, —CF$_2$CHF$_2$, —CF$_2$CH$_3$, —CF$_2$CH$_2$F, —CHFCF$_3$, —CHFCHF$_2$, —CHFCH$_3$, —CHFCH$_2$F, —CH$_2$CF$_3$, —CH$_2$CHF$_2$, —CH$_2$CH$_2$F, —CF(CF$_3$)$_2$, or —CH(CF$_3$)$_2$;

$R^7$ is H, alkyl, aryl, aralkyl, heteroaryl, heterocyclyl, alkenyl, alkynyl, silyl, siloxy, an ether, a polyalkylene glycol, —CFH$_2$, —CF$_2$H, —CF$_3$, —CF$_2$CF$_3$, —CF$_2$CHF$_2$, —CF$_2$CH$_3$, —CF$_2$CH$_2$F, —CHFCF$_3$, —CHFCHF$_2$, —CHFCH$_3$, —CHFCH$_2$F, —CH$_2$CF$_3$, —CH$_2$CHF$_2$, —CH$_2$CH$_2$F, —CF(CF$_3$)$_2$, or —CH(CF$_3$)$_2$;

q is 0, 1, or 2;

$R^{10}$, $R^{10'}$, $R^{11}$ and $R^{11'}$ are individually H, F, alkyl, alkenyl, alkynyl, aryl, aralkyl, heteroaryl, heteroarylalkyl, heterocyclylalkyl, heterocyclylalkyl, cycloalkyl, cycloalkylalkyl, silyl, siloxy, an ether, a polyalkylene glycol, —CFH$_2$, —CF$_2$H, —CF$_3$, —CF$_2$CF$_3$, —CF$_2$CHF$_2$, —CF$_2$CH$_3$, —CF$_2$CH$_2$F, —CHFCF$_3$, —CHFCHF$_2$, —CHFCH$_3$, —CHFCH$_2$F, —CH$_2$CF$_3$, —CH$_2$CHF$_2$, —CH$_2$CH$_2$F, —CF(CF$_3$)$_2$, or —CH(CF$_3$)$_2$, or $R^{10}$ and $R^{11}$ or $R^{10'}$ and $R^{11'}$ may join to form a heterocycle with the nitrogen to which they are attached, with the proviso for Formula (III) that at least one of $R^{10}$, $R^{10'}$, $R^{11}$ and $R^{11'}$ is other than H; and $R^{12}$ is H, —C(O)R$^7$, alkyl, aryl, aralkyl, heteroaryl, heterocyclyl, alkenyl, alkynyl, silyl, siloxy, an ether, a polyalkylene glycol, —CFH$_2$, —CF$_2$H, —CF$_3$, —CF$_2$CF$_3$, —CF$_2$CHF$_2$, —CF$_2$CH$_3$, —CF$_2$CH$_2$F, —CHFCF$_3$, —CHFCHF$_2$, —CHFCH$_3$, —CHFCH$_2$F, —CH$_2$CF$_3$, —CH$_2$CHF$_2$, —CH$_2$CH$_2$F, —CF(CF$_3$)$_2$, or —CH(CF$_3$)$_2$; and wherein any of the alkyl, aryl, aralkyl, heteroaryl, heterocyclyl, alkenyl, or alkynyl groups are substituted or unsubstituted.

In some embodiments, the compounds of Formula (I), (II), and (III), are compounds of Formulae (Ia), (Ib), (IIa), (IIb), (IIIa), or (IIIb):

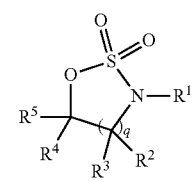
(Ia)

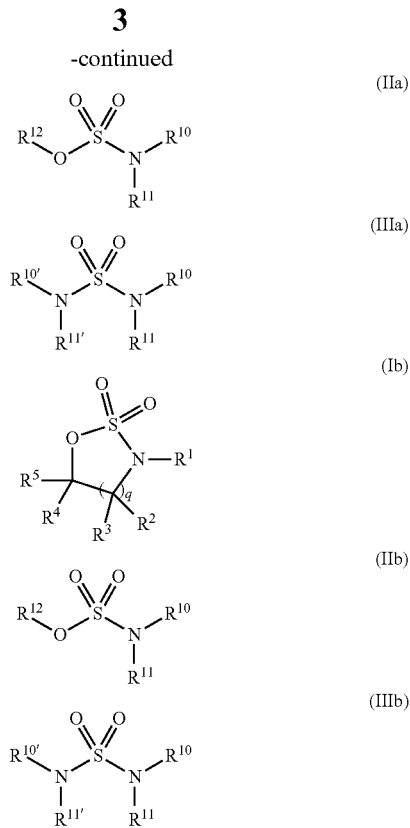

In one embodiment, the compound is of Formula (I), (Ia), or (Ib). In such embodiments, $R^1$ may be $C_{1-6}$ alkyl, $-(CR^{20}{}_2)_pO(C_1-C_6$ alkyl), $-(CR^{20}{}_2)_pO(C_1-C_6$ aryl), or $-(CR^{20}{}_2)_pO(C_1-C_6$ aralkyl); $R^2$, $R^3$, $R^4$, and $R^5$ may be each H, F, $OR^6$, or $C_{1-6}$ alkyl; each $R^{20}$ may be individually H or F; and p may be 1, 2, or 3. Alternatively, $R^1$ may be methyl, ethyl, or benzyl; and $R^2$, $R^3$, $R^4$, and $R^5$ are each H. In a further alternative, $R^1$ may be $C_{1-6}$ fluorinated alkyl, $C_{1-6}$ fluorinated alkenyl, or $C_{1-6}$ fluorinated alkynyl; and $R^2$, $R^3$, $R^4$, and $R^5$ are $C_{1-6}$ fluorinated alkyl or H.

In another embodiment, the compound is of Formula (II), (IIa), or (IIb). In such embodiments, $R^{10}$ and $R^{11}$ may be individually $C_{1-6}$ alkyl, $-(CR^{20}{}_2)_pO(C_1-C_6$ alkyl), $-(CR^{20}{}_2)_pO(C_1-C_6$ aryl), or $-(CR^{20}{}_2)_pO(C_1-C_6$ aralkyl); $R^{12}$ is $C_{1-6}$ alkyl, $-(CR^{20}{}_2)_pO(C_1-C_6$ alkyl), $-(CR^{20}{}_2)_pO(C_1-C_6$ aryl), or $-(CR^{20}{}_2)_pO(C_1-C_6$ aralkyl); each $R^{20}$ may be individually H or F; and p may be 1, 2, or 3. In a further alternative, $R^{10}$ and $R^{11}$ are individually methyl, ethyl, or benzyl; and $R^{12}$ is methyl, ethyl, or benzyl. In a yet further alternative, $R^{10}$ and $R^{11}$ are individually $C_{1-6}$ fluorinated alkyl, $C_{1-6}$ fluorinated alkenyl, or $C_{1-6}$ fluorinated alkynyl; and $R^{12}$ is fluorinated alkyl.

And, in yet other embodiments, the compound is of Formula (III), (IIIa), or (IIIb). In such embodiments, $R^{10}$, $R^{10'}$, $R^{11}$, and $R^{11'}$ may be individually $C_{1-6}$ alkyl, $-(CR^{20}{}_2)_p O(C_1-C_6$ alkyl), $-(CR^{20}{}_2)_pO(C_1-C_6$ aryl), or $-(CR^{20}{}_2)_pO(C_1-C_6$ aralkyl); each $R^{20}$ may be individually H or F; and p may be 1, 2, or 3. In a further alternative, $R^{10}$, $R^{10'}$, $R^{11}$, and $R^{11'}$ are individually methyl, ethyl, or benzyl. In a yet further alternative, $R^{10}$, $R^{10'}$, $R^{11}$, and $R^{11'}$ are individually $C_{1-6}$ fluorinated alkyl, $C_{1-6}$ fluorinated alkenyl, or $C_{1-6}$ fluorinated alkynyl.

In another aspect, an electrochemical cell includes an anode, a cathode, and a non-aqueous electrolyte that includes a salt, a non-aqueous solvent, and from greater than 0 wt % to about 20 wt % of a compound of Formula (I), Formula (Ia), Formula (Ib), Formula (II), Formula (IIa), Formula (IIb), Formula (III), Formula (IIIa), and/or Formula (IIIb), as described above and herein in various embodiments.

DETAILED DESCRIPTION

Figure 1:
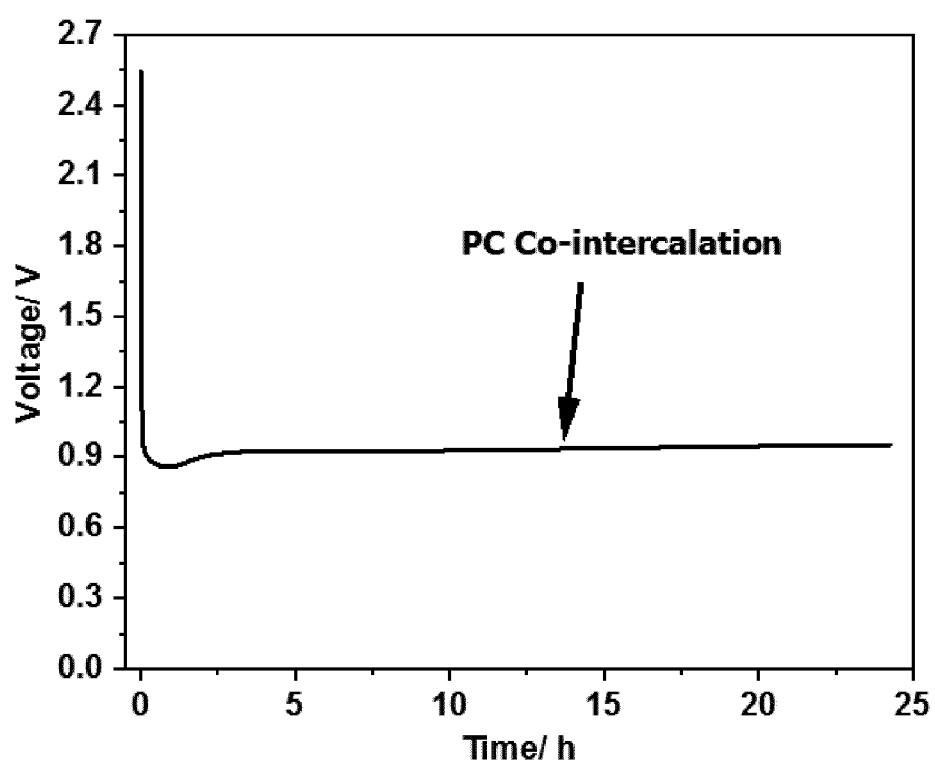
FIG. 1 is a voltage profile graph based on cells prepared with an electrolyte of 1.2M $LiPF_6$ in PC, a graphite cathode, and a lithium metal anode, according to Example 1.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, the following definitions of terms shall apply unless otherwise indicated.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

In general, "substituted" refers to a group, as defined below (e.g., an alkyl or aryl group) in which one or more bonds to a hydrogen atom contained therein are replaced by a bond to non-hydrogen or non-carbon atoms. Substituted groups also include groups in which one or more bonds to a carbon(s) or hydrogen(s) atom are replaced by one or more bonds, including double or triple bonds, to a heteroatom. Thus, a substituted group will be substituted with one or more substituents, unless otherwise specified. In some embodiments, a substituted group is substituted with 1, 2, 3, 4, 5, or 6 substituents. Examples of substituent groups include: halogens (i.e., F, Cl, Br, and I); hydroxyls; alkoxy, alkenoxy, alkynoxy, aryloxy, aralkyloxy, carbonyls(oxo), carboxyls, esters, urethanes, thiols, sulfides, sulfoxides, sulfones, sulfonyls, sulfonamides, amines, isocyanates, isothiocyanates, cyanates, thiocyanates, nitro groups, nitriles (i.e., CN), and the like.

Alkyl groups include straight chain and branched alkyl groups having from 1 to 20 carbon atoms or, in some embodiments, from 1 to 12, 1 to 8, 1 to 6, or 1 to 4 carbon atoms. Alkyl groups further include cycloalkyl groups. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, tert-butyl, neopentyl, isopentyl, and 2,2-dimethylpropyl groups. Representative substituted alkyl groups may be substituted one or more times with substituents such as those listed above. Where the term haloalkyl is used, the alkyl group is substituted with one or more halogen atoms.

Cycloalkyl groups are cyclic alkyl groups (as are considered to be a subset of alkyl) such as, but not limited to, cyclopropyl, cyclobutyl, cyclopentyl, cyclohexyl, cycloheptyl, and cyclooctyl groups. In some embodiments, the cycloalkyl group has 3 to 8 ring members, whereas in other embodiments the number of ring carbon atoms range from 3 to 5, 3 to 6, or 3 to 7. Cycloalkyl groups further include mono-, bicyclic and polycyclic ring systems, such as, for example bridged cycloalkyl groups as described below, and fused rings, such as, but not limited to, decalinyl, and the like. In some embodiments, polycyclic cycloalkyl groups have three rings. Substituted cycloalkyl groups may be substituted one or more times with, non-hydrogen and non-carbon groups as defined above. However, substituted cycloalkyl groups also include rings that are substituted with straight or branched chain alkyl groups as defined above. Representative substituted cycloalkyl groups may be mono-substituted or substituted more than once, such as, but not limited to, 2,2-, 2,3-, 2,4-2,5- or 2,6-disubstituted cyclohexyl groups, which may be substituted with substituents such as those listed above.

Alkenyl groups include straight and branched chain and cycloalkyl groups as defined above, except that at least one double bond exists between two carbon atoms. Thus, alkenyl groups have from 2 to about 20 carbon atoms, and typically from 2 to 12 carbons or, in some embodiments, from 2 to 8, 2 to 6, or 2 to 4 carbon atoms. In some embodiments, alkenyl groups include cycloalkenyl groups having from 4 to 20 carbon atoms, 5 to 20 carbon atoms, 5 to 10 carbon atoms, or even 5, 6, 7, or 8 carbon atoms. Examples include, but are not limited to vinyl, allyl, $CH=CH(CH_3)$, $CH=C(CH_3)_2$, $-C(CH_3)=CH_2$, $-C(CH_3)=CH(CH_3)$, $-C(CH_2CH_3)=CH_2$, cyclohexenyl, cyclopentenyl, cyclohexadienyl, butadienyl, pentadienyl, and hexadienyl, among others. Representative substituted alkenyl groups may be mono-substituted or substituted more than once, such as, but not limited to, mono-, di- or tri-substituted with substituents such as those listed above.

Alkynyl groups include straight and branched chain alkyl groups, except that at least one triple bond exists between two carbon atoms. Thus, alkynyl groups have from 2 to about 20 carbon atoms, and typically from 2 to 12 carbons or, in some embodiments, from 2 to 8, 2 to 6, or 2 to 4 carbon atoms. Examples include, but are not limited to $-C\equiv CH$, $-C\equiv C(CH_3)$, $-C\equiv C(CH_2CH_3)$, $-CH_2C\equiv CH$, $-CH_2C\equiv C(CH_3)$, and $-CH_2C\equiv C(CH_2CH_3)$, among others. Representative substituted alkynyl groups may be mono-substituted or substituted more than once, such as, but not limited to, mono-, di- or tri-substituted with substituents such as those listed above.

Aryl, or arene, groups are cyclic aromatic hydrocarbons that do not contain heteroatoms. Aryl groups include monocyclic, bicyclic and polycyclic ring systems. Thus, aryl groups include, but are not limited to, phenyl, azulenyl, heptalenyl, biphenylenyl, indacenyl, fluorenyl, phenanthrenyl, triphenylenyl, pyrenyl, naphthacenyl, chrysenyl, biphenyl, anthracenyl, indenyl, indanyl, pentalenyl, and naphthyl groups. In some embodiments, aryl groups contain 6-14 carbons, and in others from 6 to 12 or even 6-10 carbon atoms in the ring portions of the groups. Although the phrase "aryl groups" includes groups containing fused rings, such as fused aromatic-aliphatic ring systems (e.g., indanyl, tetrahydronaphthyl, and the like), it does not include aryl groups that have other groups, such as alkyl or halo groups, bonded to one of the ring members. Rather, groups such as tolyl are referred to as substituted aryl groups. Representative substituted aryl groups may be mono-substituted or substituted more than once. For example, monosubstituted aryl groups include, but are not limited to, 2-, 3-, 4-, 5-, or 6-substituted phenyl or naphthyl groups, which may be substituted with substituents such as those listed above.

"Alkoxy" refers to the group —O-alkyl wherein alkyl is defined herein. Alkoxy includes, by way of example, methoxy, ethoxy, n-propoxy, isopropoxy, n-butoxy, t-butoxy, sec-butoxy, and n-pentoxy.

It has now been found that organosulfamate compounds (i.e. those having an —NS(O)$_2$O— moiety) may be used in electrolytes for batteries. The organosulfamate compounds have been found to produce effective SEI layers within the cell that prevent, or at least inhibit co-intercalation of the electrolyte solvents in the graphite containing electrodes.

In one aspect, a non-aqueous electrolyte is provided that includes a salt and a compound of Formula (I), Formula (II), Formula (III), or a mixture of any two or more thereof:

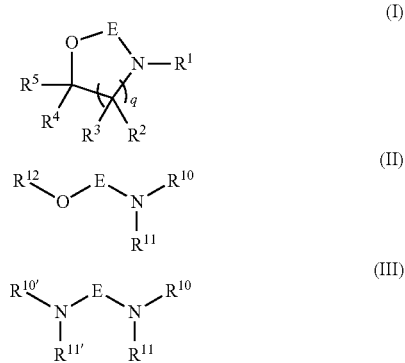

In the above compounds,
E is —S(O)— or —S(O)$_2$—;
$R^1$ may be H, F, alkyl, alkenyl, alkynyl, aryl, aralkyl, heteroaryl, heteroarylalkyl, heterocyclylalkyl, heterocyclylalkyl, cycloalkyl, cycloalkylalkyl, silyl, siloxy, an ether, a polyalkylene glycol, —CFH$_2$, —CF$_2$H, —CF$_3$, —CF$_2$CF$_3$, —CF$_2$CHF$_2$, —CF$_2$CH$_3$, —CF$_2$CH$_2$F, —CHFCF$_3$, —CHFCHF$_2$, —CHFCH$_3$, —CHFCH$_2$F, —CH$_2$CF$_3$, —CH$_2$CHF$_2$, —CH$_2$CH$_2$F, —CF(CF$_3$)$_2$, or —CH(CF$_3$)$_2$;
$R^2$, $R^3$, $R^4$, and $R^5$ may be individually H, F, alkyl, alkenyl, alkynyl, aryl, aralkyl, heteroaryl, heteroarylalkyl, heterocyclylalkyl, heterocyclylalkyl, cycloalkyl, cycloalkylalkyl, silyl, siloxy, an ether, a polyalkylene glycol, —CFH$_2$, —CF$_2$H, —CF$_3$, —CF$_2$CF$_3$, —CF$_2$CHF$_2$, —CF$_2$CH$_3$, —CF$_2$CH$_2$F, —CHFCF$_3$, —CHFCHF$_2$, —CHFCH$_3$, —CHFCH$_2$F, —CH$_2$CF$_3$, —CH$_2$CHF$_2$, —CH$_2$CH$_2$F, —CF(CF$_3$)$_2$, or —CH(CF$_3$)$_2$;
$R^6$ may be H, —C(O)R$^7$, alkyl, aryl, aralkyl, heteroaryl, heterocyclyl, alkenyl, alkynyl, silyl, siloxy, an ether, a polyalkylene glycol, —CFH$_2$, —CF$_2$H, —CF$_3$, —CF$_2$CF$_3$, —CF$_2$CHF$_2$, —CF$_2$CH$_3$, —CF$_2$CH$_2$F, —CHFCF$_3$, —CHFCHF$_2$, —CHFCH$_3$, —CHFCH$_2$F, —CH$_2$CF$_3$, —CH$_2$CHF$_2$, —CH$_2$CH$_2$F, —CF(CF$_3$)$_2$, or —CH(CF$_3$)$_2$;
$R^7$ may be H, alkyl, aryl, aralkyl, heteroaryl, heterocyclyl, alkenyl, alkynyl, silyl, siloxy, an ether, a polyalkylene glycol, —CFH$_2$, —CF$_2$H, —CF$_3$, —CF$_2$CF$_3$, —CF$_2$CHF$_2$, —CF$_2$CH$_3$, —CF$_2$CH$_2$F, —CHFCF$_3$, —CHFCHF$_2$, —CHFCH$_3$, —CHFCH$_2$F, —CH$_2$CF$_3$, —CH$_2$CHF$_2$, —CH$_2$CH$_2$F, —CF(CF$_3$)$_2$, or —CH(CF$_3$)$_2$;
q may be 0, 1, or 2;
$R^{10}$, $R^{10'}$, $R^{11}$ and $R^{11'}$ may be individually be H, F, alkyl, alkenyl, alkynyl, aryl, aralkyl, heteroaryl, heteroarylalkyl, heterocyclylalkyl, heterocyclylalkyl, cycloalkyl, cycloalkylalkyl, silyl, siloxy, an ether, a polyalkylene glycol, —CFH$_2$, —CF$_2$H, —CF$_3$, —CF$_2$CF$_3$, —CF$_2$CHF$_2$, —CF$_2$CH$_3$, —CF$_2$CH$_2$F, —CHFCF$_3$, —CHFCHF$_2$, —CHFCH$_3$, —CHFCH$_2$F, —CH$_2$CF$_3$, —CH$_2$CHF$_2$, —CH$_2$CH$_2$F, —CF(CF$_3$)$_2$, or —CH(CF$_3$)$_2$, or $R^{10}$ and $R^{11}$ or $R^{10'}$ and $R^{11'}$ may join to form a heterocycle with the nitrogen to which they are attached, with the proviso for Formula (III) that at least one of $R^{10}$, $R^{10'}$, $R^{11}$ and $R^{11'}$ is other than H; and
$R^{12}$ may be H, —C(O)R$^7$, alkyl, aryl, aralkyl, heteroaryl, heterocyclyl, alkenyl, alkynyl, silyl, siloxy, an ether, a polyalkylene glycol, —CFH$_2$, —CF$_2$H, —CF$_3$, —CF$_2$CF$_3$, —CF$_2$CHF$_2$, —CF$_2$CH$_3$, —CF$_2$CH$_2$F, —CHFCF$_3$, —CHFCHF$_2$, —CHFCH$_3$, —CHFCH$_2$F, —CH$_2$CF$_3$, —CH$_2$CHF$_2$, —CH$_2$CH$_2$F, —CF(CF$_3$)$_2$, or —CH(CF$_3$)$_2$; and
wherein any of the alkyl, aryl, aralkyl, heteroaryl, heterocyclyl, alkenyl, or alkynyl groups may be substituted or unsubstituted. In some embodiments of Formula (II), it may be subject to the proviso that at least one of $R^{10}$ and $R^{11}$ is other than H.

In some embodiments, the compounds of Formula (I), (II), and/or (III), are compounds of Formula (Ia), (Ib), (IIa), (IIb), (IIIa), and/or (IIIb):

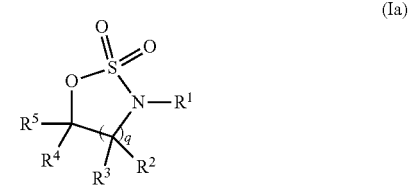

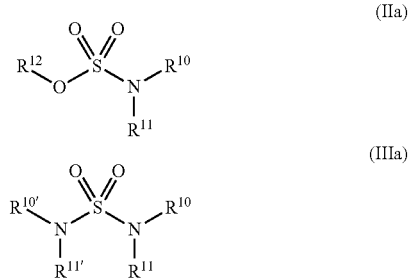

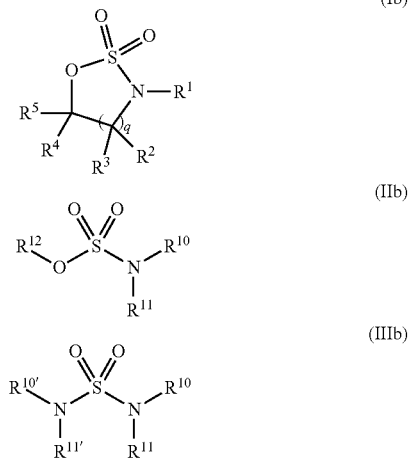

In some embodiments, the compound is of Formula (I), (Ia), or (Ib). Where the compound is of Formula (I), (Ia), or (Ib), in some embodiments, $R^1$ may be $C_{1-6}$ alkyl, —(CR$^{20}_2$)$_p$O(C$_1$-C$_6$ alkyl), —(CR$^{20}_2$)$_p$O(C$_1$-C$_6$ aryl), or —(CR$^{20}_2$)$_p$O(C$_1$-C$_6$ aralkyl); $R^2$, $R^3$, $R^4$, and $R^5$ may be each H, F, OR$^6$, or $C_{1-6}$ alkyl; each $R^{20}$ may be individually H or F; and p may be 1, 2, or 3. In other embodiments, $R^1$ may be methyl, ethyl, or benzyl; and $R^2$, $R^3$, $R^4$, and $R^5$ may be each H. Alternatively, $R^1$ may be $C_{1-6}$ fluorinated alkyl, $C_{1-6}$ fluorinated alkenyl, or $C_{1-6}$ fluorinated alkynyl; and $R^2$, $R^3$, $R^4$, and $R^5$ may be $C_{1-6}$ fluorinated alkyl or H. In yet other embodiments, $R^1$ may be —$CH_3$, —$CFH_2$, —$CF_2H$, —$CF_3$, —$CH_2CH_3$, —$CFHCH_3$, —$CH_2CFH_2$, —$CH_2CF_2H$, —$CH_2CF_3$, —$CFHCH_3$, —$CFHCFH_2$, —$CFHCF_2H$, —$CFHCF_3$, —$CF_2CH_3$, —$CF_2CFH_2$, —$CF_2CF_2H$, —$CF_2CF_3$, —$CHCH_2$, —$CFCH_2$, —$CHCFH$, —$CHCF_2$, —$CFCFH$, —$CFCF_2$, —$CH_2CF_2CF_3$, —$CF(CH_3)_2$, —$CH_2CF_2CF_3$, —$CF_2CF(CF_3)_2$, —$CH_2CF_2CF_2H$, —$CH_2OCF_3$, —$CF_2OCF_3$, —$CH_2OCF_2CF_2CF_3$, —$CH_2OCF_2CF_2CF_3$, —$CF_2OCF_2CF_2CF_3$, —$C_6F_5$, —$CH_2OC_6F_5$; —$CH_2CH_2CH_2CH_3$, —$CH(CH_3)_2$, —$CH_2CH_2(CH_3)_2$, —$CH_2OCH_3$, —$C_6H_5$, —$CH_2OC_6H_5$, —$CH_2OCH_2CH_3$, —$CH_2OCH(CH_3)_2$, —$C(CH_3)HOCH_3$, —$CH_2CH_2OCH_3$, or —$CH_2CH_2OCH_2CH_3$; and $R^2$, $R^3$, $R^4$, and $R^5$ may be individually H, —$CH_3$, —$CFH_2$, —$CF_2H$, —$CF_3$, —$CH_2CH_3$, —$CFHCH_3$, —$CH_2CFH_2$, —$CH_2CF_2H$, —$CH_2CF_3$, —$CFHCH_3$, —$CFHCFH_2$, —$CFHCF_2H$, —$CFHCF_3$, —$CF_2CH_3$, —$CF_2CFH_2$, —$CF_2CF_2H$, —$CF_2CF_3$, —$CHCH_2$, —$CFCH_2$, —$CHCFH$, —$CHCF_2$, —$CFCFH$, —$CFCF_2$, —$CH_2CF_2CF_3$, —$CF(CH_3)_2$, —$CH_2CF_2CF_3$, —$CF_2CF(CF_3)_2$, —$CH_2CF_2CF_2H$, —$CH_2OCF_3$, —$CF_2OCF_3$, —$CH_2OCF_2CF_2CF_3$, —$CH_2OCF_2CF_2CF_3$, —$CF_2OCF_2CF_2CF_3$, —$C_6F_5$, —$CH_2OC_6F_5$; —$CH_2CH_2CH_2CH_3$, —$CH(CH_3)_2$, —$CH_2CH_2(CH_3)_2$, —$CH_2OCH_3$, —$C_6H_5$, —$CH_2OC_6H_5$, —$CH_2OCH_2CH_3$, —$CH_2OCH(CH_3)_2$, —$C(CH_3)HOCH_3$, —$CH_2CH_2OCH_3$, or —$CH_2CH_2OCH_2CH_3$.

In some embodiments, the compound is of Formula (II), (IIa), or (IIb). Where the compound is of Formula (II), (IIa), or (IIb), in some embodiments, $R^{10}$ and $R^{11}$ may be individually $C_{1-6}$ alkyl, —$(CR^{20}_2)_pO(C_1-C_6$ alkyl), —$(CR^{20}_2)_pO(C_1-C_6$ aryl), or —$(CR^{20}_2)_pO(C_1-C_6$ aralkyl); $R^{12}$ may be $C_{1-6}$ alkyl, —$(CR^{20}_2)_pO(C_1-C_6$ alkyl), —$(CR^{20}_2)_pO(C_1-C_6$ aryl), or —$(CR^{20}_2)_pO(C_1-C_6$ aralkyl); each $R^{20}$ may be individually H or F; and p is 1, 2, or 3. In other embodiments, $R^{10}$ and $R^{11}$ may be individually methyl, ethyl, or benzyl; and $R^{12}$ may be methyl, ethyl, or benzyl. Alternatively, $R^{10}$ and $R^{11}$ may be individually $C_{1-6}$ fluorinated alkyl, $C_{1-6}$ fluorinated alkenyl, or $C_{1-6}$ fluorinated alkynyl; and $R^{12}$ may be fluorinated alkyl. In yet other embodiments, $R^{10}$ and $R^{11}$ may be individually —$CH_3$, —$CFH_2$, —$CF_2H$, —$CF_3$, —$CH_2CH_3$, —$CFHCH_3$, —$CH_2CFH_2$, —$CH_2CF_2H$, —$CH_2CF_3$, —$CFHCH_3$, —$CFHCFH_2$, —$CFHCF_2H$, —$CFHCF_3$, —$CF_2CH_3$, —$CF_2CFH_2$, —$CF_2CF_2H$, —$CF_2CF_3$, —$CHCH_2$, —$CFCH_2$, —$CHCFH$, —$CHCF_2$, —$CFCFH$, —$CFCF_2$, —$CH_2CF_2CF_3$, —$CF(CH_3)_2$, —$CH_2CF_2CF_3$, —$CF_2CF(CF_3)_2$, —$CH_2CF_2CF_2H$, —$CH_2OCF_3$, —$CF_2OCF_3$, —$CH_2OCF_2CF_2CF_3$, —$CH_2OCF_2CF_2CF_3$, —$CF_2OCF_2CF_2CF_3$, —$C_6F_5$, —$CH_2OC_6F_5$; —$CH_2CH_2CH_2CH_3$, —$CH(CH_3)_2$, —$CH_2CH_2(CH_3)_2$, —$CH_2OCH_3$, —$C_6H_5$, —$CH_2OC_6H_5$, —$CH_2OCH_2CH_3$, —$CH_2OCH(CH_3)_2$, —$C(CH_3)HOCH_3$, —$CH_2CH_2OCH_3$, or —$CH_2CH_2OCH_2CH_3$; and $R^{12}$ is —$CH_3$, —$CFH_2$, —$CF_2H$, —$CF_3$, —$CH_2CH_3$, —$CFHCH_3$, —$CH_2CFH_2$, —$CH_2CF_2H$, —$CH_2CF_3$, —$CFHCH_3$, —$CFHCFH_2$, —$CFHCF_2H$, —$CFHCF_3$, —$CF_2CH_3$, —$CF_2CFH_2$, —$CF_2CF_2H$, —$CF_2CF_3$, —$CHCH_2$, —$CFCH_2$, —$CHCFH$, —$CHCF_2$, —$CFCFH$, —$CFCF_2$, —$CH_2CF_2CF_3$, —$CF(CH_3)_2$, —$CH_2CF_2CF_3$, —$CF_2CF(CF_3)_2$, —$CH_2CF_2CF_2H$, —$CH_2OCF_3$, —$CF_2OCF_3$, —$CH_2OCF_2CF_2CF_3$, —$CH_2OCF_2CF_2CF_3$, —$CF_2OCF_2CF_2CF_3$, —$C_6F_5$, —$CH_2OC_6F_5$; —$CH_2CH_2CH_2CH_3$, —$CH(CH_3)_2$, —$CH_2CH_2(CH_3)_2$, —$CH_2OCH_3$, —$C_6H_5$, —$CH_2OC_6H_5$, —$CH_2OCH_2CH_3$, —$CH_2OCH(CH_3)_2$, —$C(CH_3)HOCH_3$, —$CH_2CH_2OCH_3$, or —$CH_2CH_2OCH_2CH_3$.

In some embodiments, the compound is of Formula (III), (IIIa), or (IIIb). Where the compound is of Formula (III), (IIIa), or (IIIb), in some embodiments, $R^{10}$, $R^{10'}$, $R^{11}$, and $R^{11'}$ may be individually $C_{1-6}$ alkyl, —$(CR^{20}_2)_pO(C_1-C_6$ alkyl), —$(CR^{20}_2)_pO(C_1-C_6$ aryl), or —$(CR^{20}_2)_pO(C_1-C_6$ aralkyl); each $R^{20}$ may be individually H or F; and p may be 1, 2, or 3. In other embodiments, $R^{10}$, $R^{10'}$, $R^{11}$, and $R^{11'}$ may be individually methyl, ethyl, or benzyl. Alternatively, $R^{10}$, $R^{10'}$, $R^{11}$, and $R^{11'}$ may be individually $C_{1-6}$ fluorinated alkyl, $C_{1-6}$ fluorinated alkenyl, or $C_{1-6}$ fluorinated alkynyl. In yet other embodiments, $R^{10}$, $R^{10'}$, $R^{11}$, and $R^{11'}$ may be individually —$CH_3$, —$CFH_2$, —$CF_2H$, —$CF_3$, —$CH_2CH_3$, —$CFHCH_3$, —$CH_2CFH_2$, —$CH_2CF_2H$, —$CH_2CF_3$, —$CFHCH_3$, —$CFHCFH_2$, —$CFHCF_2H$, —$CFHCF_3$, —$CF_2CH_3$, —$CF_2CFH_2$, —$CF_2CF_2H$, —$CF_2CF_3$, —$CHCH_2$, —$CFCH_2$, —$CHCFH$, —$CHCF_2$, —$CFCFH$, —$CFCF_2$, —$CH_2CF_2CF_3$, —$CF(CH_3)_2$, —$CH_2CF_2CF_3$, —$CF_2CF(CF_3)_2$, —$CH_2CF_2CF_2H$, —$CH_2OCF_3$, —$CF_2OCF_3$, —$CH_2OCF_2CF_2CF_3$, —$CH_2OCF_2CF_2CF_3$, —$CF_2OCF_2CF_2CF_3$, —$C_6F_5$, —$CH_2OC_6F_5$; —$CH_2CH_2CH_2CH_3$, —$CH(CH_3)_2$, —$CH_2CH_2(CH_3)_2$, —$CH_2OCH_3$, —$C_6H_5$, —$CH_2OC_6H_5$, —$CH_2OCH_2CH_3$, —$CH_2OCH(CH_3)_2$, —$C(CH_3)HOCH_3$, —$CH_2CH_2OCH_3$, or —$CH_2CH_2OCH_2CH_3$.

In the electrolytes the compound (i.e. Formula (I), (Ia), (Ib), (II), (IIa), (IIb), (III), (IIIa), or (IIIb)) may have a dual action as an SEI layer and solvent in the electrolyte, if the melting point of the compound is low enough. In other embodiments, the electrolyte also includes a non-aqueous solvent, and the compound is added at lower levels to form the SEI layer. Where the compound is included at additive levels in the electrolyte, the compound may be present in the electrolyte from greater than 0 wt % up to about 20 wt %, based upon the total weight of the electrolyte, with the balance being the non-aqueous solvent, salt, and other option additives that may be present. This includes from about 2 wt % to about 15 wt % of the compound, or from about 5 wt % to about 12 wt % of the compound. In some embodiments where the compound is included at additive levels it is from about 0.01 wt % to about 10 wt %.

Where the electrolyte further includes a non-aqueous solvent, it may be a carbonate, a sulfone, a siloxane, a silane, an ether, an ester, a lactone, ionic liquids, any fluorinated derivatives thereof, or a blend of any two or more such solvents. For example, the solvent may include one or more of dimethyl carbonate, ethyl methyl carbonate, diethyl carbonate, methyl propyl carbonate, ethyl propyl carbonate, dipropyl carbonate, dimethoxyethane, triglyme, propylene carbonate, dimethylvinylene carbonate, tetraethyleneglycol, dimethyl ether, polyethylene glycols, α-butyrolactone, ethylene carbonate, DFEC, FEMC, bis(trifluoroethyl) carbonate, bis(pentafluoropropyl) carbonate, trifluoroethyl methyl carbonate, pentafluoroethyl methyl carbonate, heptafluoropropyl methyl carbonate, perfluorobutyl methyl carbonate, trifluoroethyl ethyl carbonate, pentafluoroethyl ethyl carbonate, heptafluoropropyl ethyl carbonate, or perfluorobutyl ethyl carbonate, as well as fluorinated solvents and fluorinated version of any of the foregoing solvents with being just two examples. In some embodiments, the non-aqueous solvent is one or more PC, EC, EMC, DFEC, or FEMC. In some embodiments, the solvent is a piperidinium-based ionic liquid or an imidazolium-based ionic liquid The salt that is used in the electrolyte may be a lithium, sodium, magnesium, calcium, or ammonium salt, or other salt as may be appropriate to the particular anode, cathode, or other cell chemistry that is being employed. In some embodiments, the salt may be a lithium salt for use in a lithium ion battery. Such salts may include, but are not limited to Li[CF$_3$CO$_2$]; Li[C$_2$F$_5$CO$_2$]; Li[ClO$_4$]; Li[BF$_4$]; Li[AsF$_6$]; Li[PF$_6$]; Li[PF$_2$(C$_2$O$_4$)$_2$]; Li[PF$_4$C$_2$O$_4$]; Li[CF$_3$SO$_3$]; Li[N(CF$_3$SO$_2$)$_2$]; Li[C(CF$_3$SO$_2$)$_3$]; Li[N(SO$_2$C$_2$F$_5$)$_2$]; lithium alkyl fluorophosphates; Li[B(C$_2$O$_4$)$_2$]; Li[BF$_2$C$_2$O$_4$]; Li$_2$[B$_{12}$X$_{12-k}$H$_k$]; and Li$_2$[B$_{10}$X$_{10-k'}$H$_{k'}$]. In such salts, X may be OH, F, Cl, or Br; k may be an integer from 0 to 12; and k' may be an integer from 0 to 10. In some embodiments, the salt may be a sodium salt for use in a sodium ion battery. Such salts may include, but are not limited to Na(CF$_3$CO$_2$); Na(C$_2$F$_5$CO$_2$); NaClO$_4$; NaBF$_4$; NaAsF$_6$; NaPF$_6$; NaPF$_2$(C$_2$O$_4$)$_2$; NaPF$_4$(C$_2$O$_4$); NaCF$_3$SO$_3$; NaCH$_3$SO$_3$; NaN(SO$_2$CF$_3$)$_2$; NaC(CF$_3$SO$_2$)$_3$; NaN(SO$_2$C$_2$F$_5$)$_2$; sodium alkyl fluorophosphates; sodium alkyl fluoroborates; sodium 4,5-dicyano-2-(trifluoromethyl)imidazole; sodium 4,5-dicyano-2-methylimidazole; trisodium 2,2',2''-tris(trifluoromethyl)benzotris(imidazolate); NaB(C$_2$O$_4$)$_2$; NaBF$_2$(C$_2$O$_4$)$_2$; Na$_2$(B$_{12}$X$_{12-k}$H$_k$); and Na$_2$(B$_{10}$X$_{10-k'}$H$_{k'}$). In such salts, X may be OH, F, Cl, or Br; k may be an integer from 0 to 12; and k' may be an integer from 0 to 10.

The electrolytes may also contain a host of other stabilizing or electron shuttling additives. For example, the electrolyte may include a stabilizing agent. Such a stabilizing agent may be used to protect the electrodes, thereby lessening or preventing subsequent performance degradation. Illustrative stabilizing agents include, but are not limited to, a spirocyclic hydrocarbon containing at least one oxygen atom and at least on alkenyl or alkynyl group, pyridazine, vinyl pyridazine, quinolone, pyridine, vinyl pyridine, 2,4-divinyl-tetrahydrooyran, 3,9-diethylidene-2,4,8-trioxaspiro[5,5]undecane, 2-ethylidene-5-vinyl-[1,3]dioxane, or a mixture of two or more thereof. In some embodiments, the electrolyte also includes redox shuttle materials. The shuttle, if present, will have an electrochemical potential above the positive electrode's maximum normal operating potential. Illustrative stabilizing agents include, but are not limited to, anisoles, 2,5-dimethyl-1,4-dimethoxybenzene, 2,3,5,6-tetramethyl-1,4-dimethoxybenzene, 2,5-di-tert-butyl-1,4-dimethoxybenzene, or a mixture of two or more thereof.

In some embodiments, the electrolyte further includes an additive that is an olefinic cyclic carbonate, fluorinated cyclic carbonate, lithium borate, organic sulfate, organic sulfite, organic sultone, or organic phosphonate. Illustrative, olefinic cyclic carbonates include, but are not limited to vinylene carbonate

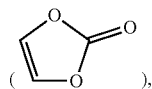

methyl vinylene carbonate

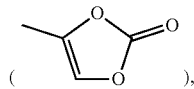

fluoroethylene carbonate, difluoroethylene carbonate, lithium difluoro(oxalato)borate, lithium bis(oxalato)borate, dioxathiolane-2,2-dioxide, ethylene sulfite, 1,3-propane sultone, or dimethyl methyl phosphonate.

In some embodiments, suitable electrode stabilizing additives include, but are not limited to 1,2-divinyl furoate, 1,3-butadiene carbonate, 1-vinylazetidin-2-one, 1-vinylaziridin-2-one, 1-vinylpiperidin-2-one, 1 vinylpyrrolidin-2-one, 2,4-divinyl-1,3-dioxane, 2 amino-3 vinylcyclohexanone, 2-amino-3-vinylcyclopropanone, 2 amino-4-vinylcyclobutanone, 2-amino-5-vinylcyclopentanone, 2-aryloxy-cyclopropanone, 2-vinyl-[1,2]oxazetidine, 2 vinylaminocyclohexanol, 2-vinylaminocyclopropanone, 2 vinyloxetane, 2-vinyloxy-cyclopropanone, 3-(N-vinylamino)cyclohexanone, 3,5-divinyl furoate, 3-vinylazetidin-2-one, 3 vinylaziridin 2 one, 3 vinylcyclobutanone, 3 vinylcyclopentanone, 3 vinyloxaziridine, 3 vinyloxetane, 3-vinylpyrrolidin-2-one, 4,4 divinyl-3 dioxolan 2-one, 4 vinyltetrahydropyran, 5-vinylpiperidin-3-one, allylglycidyl ether, butadiene monoxide, butyl vinyl ether, dihydropyran-3-one, divinyl butyl carbonate, divinyl carbonate, divinyl crotonate, divinyl ether, divinyl ethylene carbonate, divinyl ethylene silicate, divinyl ethylene sulfate, divinyl ethylene sulfite, divinyl methoxypyrazine, divinyl methylphosphate, divinyl propylene carbonate, ethyl phosphate, methoxy-o-terphenyl, methyl phosphate, oxetan-2-yl-vinylamine, oxiranylvinylamine, vinyl carbonate, vinyl crotonate, vinyl cyclopentanone, vinyl ethyl-2-furoate, vinyl ethylene carbonate, vinyl ethylene silicate, vinyl ethylene sulfate, vinyl ethylene sulfite, vinyl methacrylate, vinyl phosphate, vinyl-2-furoate, vinylcylopropanone, vinylethylene oxide, β-vinyl-γ-butyrolactone, or a mixture of any two or more thereof. In some embodiments the electrode stabilizing additive may be a cyclotriphosphazene that is substituted with F, alkyloxy, alkenyloxy, aryloxy, methoxy, allyloxy groups, or combinations thereof. For example, the additive may be a (divinyl)-(methoxy)(trifluoro)cyclotriphosphazene, (trivinyl)(difluoro)(methoxy)cyclotriphosphazene, (vinyl)(methoxy)(tetrafluoro)cyclotriphosphazene, (aryloxy)(tetrafluoro)(methoxy)-cyclotriphosphazene, (diaryloxy)(trifluoro)(methoxy)cyclotriphosphazene compounds, or a mixture of two or more such compounds. In some embodiments, the electrode stabilizing additive is vinyl ethylene carbonate, vinyl carbonate, or 1,2-diphenyl ether.

In other embodiments, the electrode stabilizing additives include compounds with phenyl, naphthyl, anthracenyl, pyrrolyl, oxazolyl, furanyl, indolyl, carbazolyl, imidazolyl, or thiophenyl groups. For example, electrode stabilizing additives may be aryloxpyrrole, aryloxy ethylene sulfate, aryloxy pyrazine, aryloxy-carbazole trivinylphosphate, aryloxy-ethyl-2-furoate, aryloxy-o-terphenyl, aryloxy-pyridazine, butyl-aryloxy-ether, divinyl diphenyl ether, (tetrahydro-furan-2-yl)-vinylamine, divinyl methoxybipyridine, methoxy-4-vinylbiphenyl, vinyl methoxy carbazole, vinyl methoxy piperidine, vinyl methoxypyrazine, vinyl methyl carbonate-allylanisole, vinyl pyridazine, 1-divinylimidazole, 3-vinyltetrahydrofuran, divinyl furan, divinyl methoxy furan, divinylpyrazine, vinyl methoxy imidazole, vinylmethoxy pyrrole, vinyl-tetrahydrofuran, 2,4-divinyl isooxazole, 3,4 divinyl-1-methyl pyrrole, aryloxyoxetane, aryloxy-phenyl carbonate, aryloxy-piperidine, aryloxy-tetrahydrofuran, 2-aryl-cyclopropanone, 2-diaryloxy-furoate, 4-allylanisole, aryloxy-carbazole, aryloxy-2-furoate, aryloxy-crotonate, aryloxy-cyclobutane, aryloxy-cyclopentanone, aryloxy-cyclopropanone, aryloxy-cycolophosphazene, aryloxy-ethylene silicate, aryloxy-ethylene sulfate, aryloxy-ethylene sulfite, aryloxy-imidazole, aryloxy-methacrylate, aryloxy-phosphate, aryloxy-pyrrole, aryloxyquinoline, diaryloxycyclotriphosphazene, diaryloxy ethylene carbonate, diaryloxy furan, diaryloxy methyl phosphate, diaryloxy-butyl carbonate, diaryloxy-crotonate, diaryloxy-diphenyl ether, diaryloxy-ethyl silicate, diaryloxy-ethylene silicate, diaryloxy-ethylene sulfate, diaryloxyethylene sulfite, diaryloxy-phenyl carbonate, diaryloxy-propylene carbonate, diphenyl carbonate, diphenyl diaryloxy silicate, diphenyl divinyl silicate, diphenyl ether, diphenyl silicate, divinyl methoxydiphenyl ether, divinyl phenyl carbonate, methoxycarbazole, or 2,4-dimethyl-6-hydroxy-pyrimidine, vinyl methoxyquinoline, pyridazine, vinyl pyridazine, quinoline, vinyl quinoline, pyridine, vinyl pyridine, indole, vinyl indole, triethanolamine, 1,3-dimethyl butadiene, butadiene, vinyl ethylene carbonate, vinyl carbonate, imidazole, vinyl imidazole, piperidine, vinyl piperidine, pyrimidine, vinyl pyrimidine, pyrazine, vinyl pyrazine, isoquinoline, vinyl isoquinoline, quinoxaline, vinyl quinoxaline, biphenyl, 1,2-diphenyl ether, 1,2-diphenylethane, o-terphenyl, N-methyl pyrrole, or naphthalene.

In yet other embodiments, the electrode stabilizing additives include substituted or unsubstituted spirocyclic hydrocarbons containing at least one oxygen atom and at least one alkenyl or alkynyl group. For example, such stabilizing additives include those having Formula VIII:

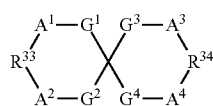

Formula VIII wherein $A^1$, $A^2$, $A^3$, and $A^4$ are independently O or $CR^{35}R^{36}$; provided that $A^1$ is not O when $G^1$ is O, $A^2$ is not O when $G^2$ is O, $A^3$ is not O when $G^3$ is O, and $A^4$ is not O when $G^4$ is O; $G^1$, $G^2$, $G^3$, and $G^4$ are independently O or $CR^{35}R^{36}$; provided that $G^1$ is not O when $A^1$ is O, $G^2$ is not O when $A^2$ is O, $G^3$ is not O when $A^3$ is O, and $G^4$ is not O when $A^4$ is O; $R^{33}$ and $R^{34}$ are independently a substituted or unsubstituted divalent alkenyl or alkynyl group; and $R^{35}$ and $R^{36}$ at each occurrence are independently H, F, Cl, or a substituted or an unsubstituted alkyl, alkenyl, or alkynyl group.

Representative examples of Formula VIII include, but are not limited to, 3,9 divinyl-2,4,8,10-tetraoxaspiro[5.5]undecane, 3,9-divinyl-2,4,8-trioxaspiro[5.5]undecane, 3,9-divinyl-2,4-dioxaspiro[5.5]undecane, 3,9-diethylidene-2,4,8,10-tetraoxaspiro[5.5]undecane, 3,9 diethylidene-2,4,8-trioxaspiro[5.5]undecane, 3,9-diethylidene-2,4-dioxaspiro[5.5]undecane, 3,9-dimethylene-2,4,8,10-tetraoxaspiro[5.5]undecane, 3,9-divinyl-1,5,7,11-tetraoxaspiro[5.5]undecane, 3,9 dimethylene-1,5,7,11-tetraoxaspiro[5.5]undecane, 3,9 diethylidene-1,5,7,11-tetraoxaspiro[5.5]undecane, or a mixture of any two or more such compounds. Furthermore, mixtures of any two or more electrode stabilizing additives may also be used in the electrolytes of the present invention.

In some embodiments, the electrode stabilizing additive is an anion receptor. Anion receptors may include, but are not limited to, compounds such as tri(propyl)borate, tris(1,1,1,3,3,3-hexafluoro-propan-2-yl)borate, tris(1,1,1,3,3,3-hexafluoro-2-phenyl-propan-2-yl)borate, tris(1,1,1,3,3,3-hexafluoro-2-(trifluoromethyl)propan-2-yl)borate, triphenyl borate, tris(4-fluorophenyl)borate, tris(2,4-difluorophenyl)borate, tris(2,3,5,6-tetrafluorophenyl)borate, tris(pentafluorophenyl)borate, tris(3-(trifluoromethyl)phenyl)borate, tris(3,5-bis(trifluoromethyl)phenyl)borate, tris(pentafluorophenyl)borane, or a mixture of any two or more thereof. Further suitable additives include 2-(2,4-difluorophenyl)-4-fluoro-1,3,2-benzodioxaborole, 2-(3-trifluoromethyl phenyl)-4-fluoro-1,3,2-benzodioxaborole, 2,5-bis(trifluoromethyl)phenyl-4-fluoro-1,3,2-benzodioxaborole, 2-(4-fluorophenyl)-tetrafluoro-1,3,2-benzodioxaborole, 2-(2,4-difluorophenyl)-tetrafluoro-1,3,2-benzodioxaborole, 2-(pentafluorophenyl)-tetrafluoro-1,3,2-benzodioxaborole, 2-(2-trifluoromethyl phenyl)-tetrafluoro-1,3,2-benzodioxaborole, 2,5-bis(trifluoromethyl phenyl)-tetrafluoro-1,3,2-benzodioxaborole, 2-phenyl-4,4,5,5-tetra(trifluoromethyl)-1,3,2-benzodioxaborolane, 2-(3,5-difluorophenyl-4,4,5,5-tetrakis(trifluoromethyl)-1,3,2-dioxaborolane, 2-(3,5-difluorophenyl-4,4,5,5-tetrakis(trifluoromethyl)-1,3,2-dioxaborolane, 2-pentafluorophenyl-4,4,5,5-tetrakis(trifluoromethyl)-1,3,2-dioxaborolane, bis(1,1,1,3,3,3-hexafluoroisopropyl)phenyl-boronate, bis(1,1,1,3,3,3-hexafluoroisopropyl)-3, 5-difluorophenylboronate, bis(1,1,1,3,3,3-hexafluoroisopropyl) pentafluorophenylboronate, or a mixture of any two or more such compounds.

In some instances, the concentration of the electrode stabilizing additive in the electrolyte generally does not greatly exceed the concentration needed to form the passivation layer. As a result, the additives are generally present in smaller concentrations than the ionic electrolyte salts. A suitable concentration for an additive in the electrolyte includes, but is not limited to, concentrations greater than about 0.1 wt %, greater than about 0.5 wt % and/or less than about 5 wt %, less than about 20 wt %, or less than about 35 wt % where each of the wt % refers to the percentage of the total weight of solvent plus additive. In some embodiments, the concentration of the additive is less than about 3 wt %, or less than about 2 wt %. In yet other embodiments, a concentration of the electrolyte additive is from about 0.1 wt % to about 35 wt %, from about 0.1 wt % to about 30 wt %, from about 0.1 wt % to about 25 wt %, from about 0.1 wt % to about 20 wt %, from about 0.1 wt % to about 10 wt %, from about 0.1 wt % to about 5 wt %, from about 0.1 wt % to about 3 wt %, from about 0.1 wt % to about 2 wt %, from about 0.1 wt % to about 1 wt %, from about 0.5 wt % to about 10 wt %, from about 0.5 wt % to about 3 wt %, or from about 0.5 wt % to about 2 wt %.

In another aspect, the non-aqueous electrolyte includes an aprotic gel polymer carrier/solvent. Suitable gel polymer carrier/solvents include polyethers, polyethylene oxides, polyimides, polyphosphazines, polyacrylonitriles, polysiloxanes, polyether grafted polysiloxanes, derivatives of the foregoing, copolymers of the foregoing, crosslinked and network structures of the foregoing, blends of the foregoing, and the like, to which is added an appropriate ionic electrolyte salt. Other gel-polymer carrier/solvents include those prepared from polymer matrices derived from polypropylene oxides, polysiloxanes, sulfonated polyimides, perfluorinated membranes (Nafion™ resins), divinyl polyethylene glycols, polyethylene glycol-bis-(methyl acrylates), polyethylene glycol-bis(methyl methacrylates), derivatives of the foregoing, copolymers of the foregoing, crosslinked and network structures of the foregoing.

In another aspect, an electrochemical device is provided. The electrochemical devices include an anode, a cathode, and any of the electrolytes described herein that contain a compound of Formula I, II, or III. In some embodiments, the compound is of Formula I. In other embodiments, the compound is of Formula II. In yet other embodiments, the compound is of Formula III. According to various embodiments, the electrochemical cells may be a lithium battery, a lithium-ion battery, a lithium-sulfur battery, a lithium-air battery, a sodium battery, a sodium-ion battery, a sodium-sulfur battery, a sodium-air battery, or a magnesium battery. In some embodiments, the electrochemical device is a lithium secondary cell. In some embodiments, the electrochemical device is a sodium secondary cell.

The electrochemical devices may include an anode which includes, but not limited to, layered structured materials of graphitic, carbonaceous, oxide or silicon, silicon-carbon composite, phosphorus-carbon composite, tin, tin alloys, silicon alloys, intermetallic compounds, lithium metal, sodium metal, or lithium titanium oxide. The anode may be stabilized by surface coating the active particles with a material. Hence the anodes can also comprise a surface coating of a metal oxide or fluoride such as $ZrO_2$, $TiO_2$, $ZnO_2$, $WO_3$, $Al_2O_3$, MgO, $SiO_2$, $SnO_2$, $AlPO_4$, $Al(OH)_3$, $AlF_3$, $ZnF_2$, $MgF_2$, $TiF_4$, $ZrF_4$, a mixture of any two or more thereof, of any other suitable metal oxide or fluoride. The anode may be further stabilized by surface coating the active particles with polymer materials. Examples of polymer coating materials include, but not limited to, polysiloxanes, polyethylene glycol, poly(3,4-ethylenedioxythiophene) polystyrene sulfonate, or a mixture of any two or more polymers.

In some embodiments, the anode of the electrochemical device includes natural graphite, synthetic graphite, hard carbon, amorphous carbon, soft carbon, mesocarbon microbeads, acetylene black, Ketjen black, carbon black, mesoporous carbon, porous carbon matrix, carbon nanotube, carbon nanofiber, graphene, silicon microparticle, silicon nanoparticle, silicon-carbon composite, tin microparticle, tin nanoparticle, tin-carbon composite, silicon-tin composite, phosphorous-carbon composites, lithium titanium oxide, lithium metal, sodium metal, lithium titanium oxide or magnesium metal.

The electrochemical devices may include a cathode which includes, but is not limited to, a spinel, an olivine, a carbon-coated olivine $LiFePO_4$, $LiMn_{0.5}Ni_{0.5}O_2$, $LiCoO_2$, $LiNiO_2$, $LiNi_{1-x}Co_yMe_zO_2$, $LiNi_\alpha Mn_\beta Co_\gamma O_2$, $LiMn_2O_4$, $LiFeO_2$, $LiNi_{0.5}Me^1_{1.5}O_4$, $Li_{1+x'}Ni_h Mn_k Co_l Me^2_{y'} O_{2-z'}F_{z'}$, $VO_2$ or $E_{x''}F_2(Me_3O_4)_3$, $LiNi_m Mn_n O_4$, wherein Me is Al, Mg, Ti, B, Ga, Si, Mn, or Co; $Me^2$ is Mg, Zn, Al, Ga, B, Zr, or Ti; E is Li, Ag, Cu, Na, Mn, Fe, Co, Ni, or Zn; F is Ti, V, Cr, Fe, or Zr; wherein $0 \le x \le 0.3$; $0 \le y \le 0.5$; $0 \le z \le 0.5$; $0 \le m \le 2$; $0 \le n \le 2$; $0 \le x' \le 0.4$; $0 \le \alpha \le 1$; $0 \le \beta \le 1$; $0 \le \gamma \le 1$; $0 \le h \le 1$; $0 \le k \le 1$; $0 \le l \le 1$; $0 \le y' \le 0.4$; $0 \le z' \le 0.4$; and $0 \le x'' \le 3$; with the proviso that at least one of h, k and l is greater than 0. In some embodiments, the cathode includes, but not limited to, $Na_xVO_2$; $NaMeO_2$; $Na_{1-y}FePO_4$; wherein $0 \le x \le 2$; $0 \le y \le 1$; Me is Al, Mg, Ti, B, Ga, Si, Ni, Mn, or Co; or an electrode material with composition $Na_a Li_b Ni_c Mn_d M_e O_f$, wherein M is a metal cation, $0 \le a \le 1$, $0 \le b \le 1$, $0 \le c \le 1$, $0 \le d \le 1$, $0 \le e \le 1$, $1 \le f \le 2$. In some embodiments, the positive electrode includes $Na_w Mn_x Ni_y Co_z O_2$ wherein w, x, y, and z satisfy the relations $0 < w < 1.5$, $0 \le x < 1$, $0 \le y < 1$, $0 \le z < 1$, and $x+y+z=1$. In some embodiments, the positive electrode includes $Na_w Me_x O_2$ wherein Me is any transition metal and w and x satisfy the relations $0 < w < 1.5$, $0 \le x < 1$.

The cathode may be further stabilized by surface coating the active particles with a material that can neutralize acid or otherwise lessen or prevent leaching of the transition metal ions. Hence the cathodes can also comprise a surface coating of a metal oxide or fluoride such as $ZrO_2$, $TiO_2$, $ZnO_2$, $WO_3$, $Al_2O_3$, MgO, $SiO_2$, $SnO_2$, $AlPO_4$, $Al(OH)_3$, $AlF_3$, $ZnF_2$, $MgF_2$, $TiF_4$, $ZrF_4$, $LiMPO_4$ or $LiMBO_3$, where in M indicates transition metal such as but not limited to Ni, Mn, Co, or a mixture of any two or more thereof, or of any other suitable metal oxide or fluoride. The coating can be applied to a carbon coated cathode. The cathode may be further stabilized by surface coating the active particles with polymer materials. Examples of polymer coating materials include, but not limited to, polysiloxanes, polyethylene glycol, or poly(3,4-ethylenedioxythiophene) polystyrene sulfonate, a mixture of any two or more polymers.

The electrodes of the electrochemical devices may also include a current collector. Current collectors for either the anode or the cathode may include, but are not limited to, those of copper, stainless steel, titanium, tantalum, platinum, gold, aluminum, nickel, cobalt, cobalt nickel alloy, highly alloyed ferritic stainless steel containing molybdenum and chromium; or nickel-, chromium-, or molybdenum containing alloys. The electrodes (i.e., the cathode and/or the anode) may also include a conductive polymer as a binder. Illustrative conductive polymers include, but not limited to, polyaniline, polypyrrole, poly(pyrrole-co-aniline), polyphenylene, polythiophene, polyacetylene, polysiloxane, or polyfluorene.

The electrochemical device disclosed herein also includes a porous separator to separate the cathode from the anode to prevent, or at least minimize, short-circuiting in the device. The separator may be a polymer or ceramic or mixed separator. The separator may include, but is not limited to, polypropylene (PP), polyethylene (PE), trilayer (PP/PE/PP), or polymer films that may optionally be coated with alumina-based ceramic particles.

The present invention, thus generally described, will be understood more readily by reference to the following examples, which are provided by way of illustration and are not intended to be limiting of the present invention.

EXAMPLES

Example 1

Synthesis of 3-methyl-1,2,3-oxathiazolidine 2,2-dioxide (MOZD). MOZD was successfully synthesized via the synthetic pathway as depicted in Scheme 1. To a 2-(methylamino)ethanol (10 g) was added sulfuryl chloride (18 g) to yield (12.5 g) crude product MOZD. To a mixture of 2-(methylamino)ethanol and imidazole in dichloromethane was added slowly sulfuryl chloride at −10° C. The mixture was allowed to stir at room temperature overnight before the addition of water. The organic phase was separated, and the aqueous phase was further extracted with DCM. The combined organic phase was washed with brine and dried over anhydrous $Na_2SO_4$. After the removal of solvent in vacuum, the crude product was dried over 4 Å molecular sieves and purified by vacuum distillation to yield a colorless liquid. The crude product was then purified by vacuum distillation to provide 7.8 g of MOZD as a liquid. The MOZD was characterized by $^1H$ and $^{13}C$ NMR to confirm its structure. $^1H$ NMR ($CDCl_3$, 300 MHz): δ 4.50 (t, 2H, J=6.9 Hz), 3.50 (t, 2H, J=6.6 Hz), 2.76 (s, 3H); $^{13}C$ NMR ($CDCl_3$, 75 MHz): δ 66.8, 50.0, 34.0.

Scheme 1

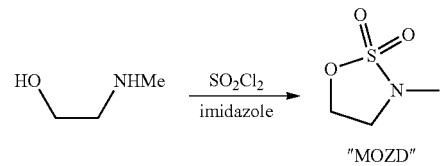

Example 2

Performance testing using 2032 coin cells. 2032 coin cells were constructed with a graphite cathode, a lithium metal anode, and various electrolytes. The electrolytes included (A) 1.2M LiPF$_6$ in a 1.2M LiPF$_6$ in propylene carbonate ("PC"); (B) 1.2M LiPF$_6$ in PC with 10 wt % of vinylene carbonate

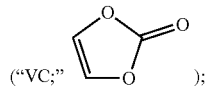

Figure 2:
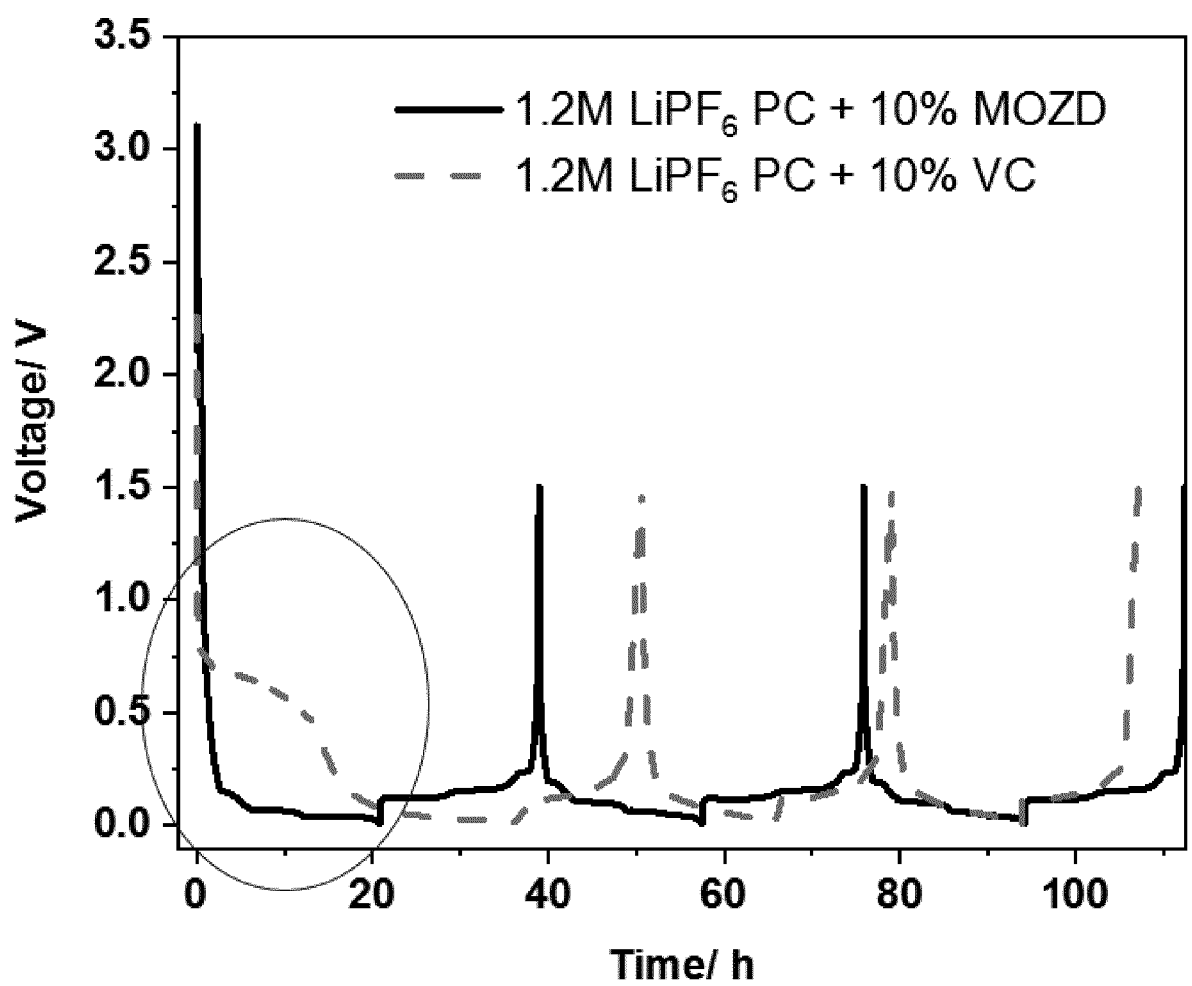
FIG. 2 a voltage profile graph based on cells prepared using 1.2M $LiPF_6$ in PC, with 10 wt % vinylene carbonate or 10 wt % MOZD, a graphite cathode, and a lithium metal anode, according to Example 2.

("VC;")

and (C) 1.2M LiPF$_6$ in PC with 10 wt % of MOZD. As illustrated in FIG. 1, the coin cell with the A electrolyte, and upon charging at a rate of C/20, the voltage profile shows a quick plateau formation indicating that the graphite has been intercalated with PC. The dashed line in FIG. 2 represents the coin cell with the B electrolyte at a charging rate of C/20, where the PC intercalates into the graphite at a voltage of about 0.9 V (see the plateau formation) vs. Li$^+$/Li. With regard to the B electrolyte, after allowing the intercalation of PC for the first 15 hours, the solid electrolyte interface (SEI) finally inhibits the co-intercalation of the PC with the lithium ions into the graphite cathode. However, as evidenced by the solid line in FIG. 2, the MOZD in the C electrolyte quickly forms an SEI layer that is effective in preventing, or at least substantially inhibiting, the co-intercalation of PC into the graphite cathode over the time of the test.

Example 3

Cycling performance. 2032 coin cells were prepared with a LiNi$_{0.6}$Mn$_{0.2}$Co$_{0.2}$O$_2$ cathode, an A12 graphite anode, and various electrolytes. The electrolytes included (D) 1.2M LiPF$_6$ in a 3:7 (wt/wt) mixture of ethylene carbonate ("EC") and ethylmethyl carbonate ("EMC") ("GEN2"); (E) 1.2M LiPF$_6$ in a 1:19 (wt/wt) mixture of difluoroethylene carbonate ("DFEC") and fluoroethylmethyl carbonate ("FEMC"); and (F) 1.2M LiPF$_6$ in a 1:19 (wt/wt) mixture of DFEC and FEMC with an added 1 wt % MOZD.

Figure 3:
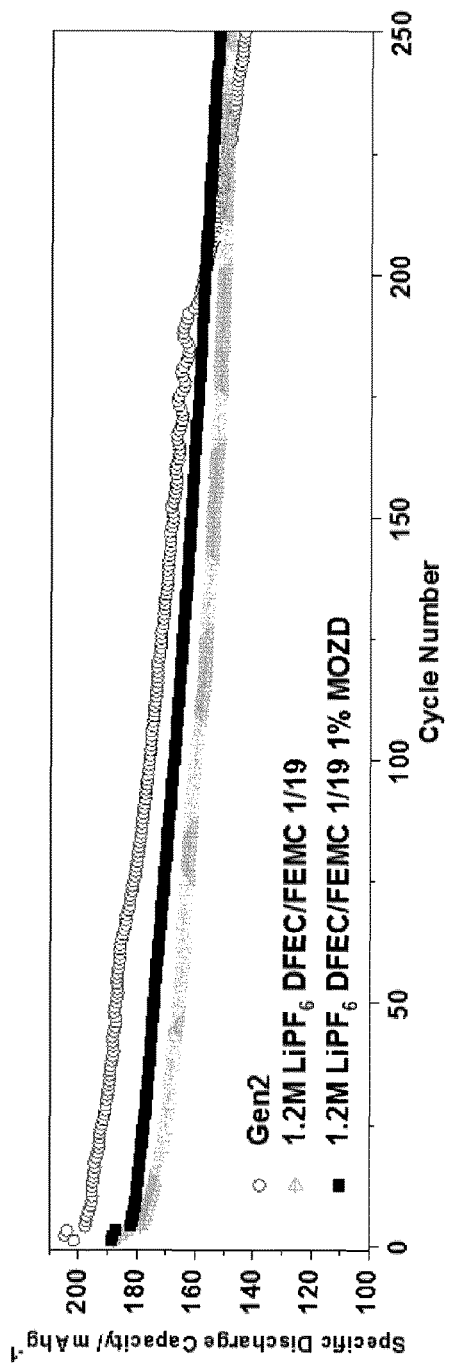
FIG. 3 is a discharge capacity vs. cycle number graph for cells based on $LiNi_{0.6}Mn_{0.2}Co_{0.2}O_2$/A12 graphite, and electrolytes containing 1.2M $LiPF_6$ in a 3:7 (wt/wt) mixture of EC and ethylmethyl carbonate; 1.2M $LiPF_6$ in 1:19 (wt/wt) difluoroethyl carbonate and fluoroethylmethyl carbonate; and 1.2M $LiPF_6$:19 (wt/wt) difluoroethyl carbonate and fluoroethylmethyl carbonate with 1 wt % MOZD, according to Example 3. The cells were cycled from 3.0 V to 4.5 V at a current of C/2.
Figure 4:
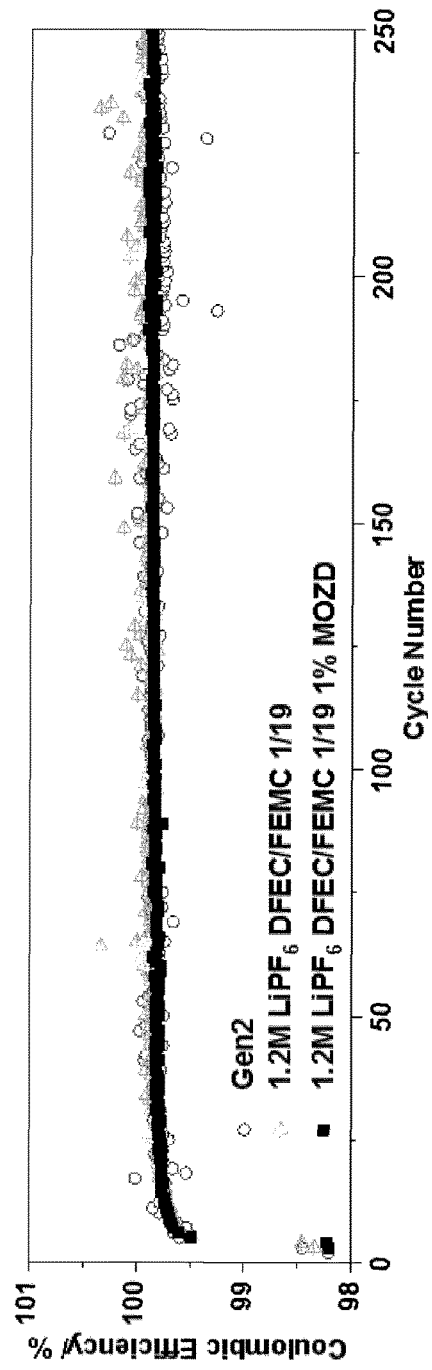
FIG. 4 is a coulombic efficiency profile for cells based on $LiNi_{0.6}Mn_{0.2}Co_{0.2}O_2$/A12 graphite, and electrolytes containing 1.2M $LiPF_6$ in a 3:7 (wt/wt) mixture of EC and ethylmethyl carbonate; 1.2M $LiPF_6$ in 1:19 (wt/wt) difluoroethyl carbonate and fluoroethylmethyl carbonate; and 1.2M $LiPF_6$:19 (wt/wt) difluoroethyl carbonate and fluoroethylmethyl carbonate with 1 wt % MOZD, according to Example 3. The cells were cycled from 3.0 V to 4.5 V at a current of C/2.

FIG. 3 depicts the discharge capacity for the cells with electrolytes D, E, and F. The coin cells were cycled from 3.0 V to 4.5 V at a current of C/2. The cell with the DFEC/FEMC-based electrolyte show much better cycling performance than the cell using the GEN2-based electrolyte, while the cell using DFEC/FEMC-based electrolyte with MOZD additive achieves the best cycling performance. FIG. 4 shows the Coulombic efficiency of the above cells. The cells all exhibited a Coulombic efficiency greater than 99%, with the DFEC/FEMC-based electrolytes exhibiting an average Coulombic efficiencies greater than 99.9%.

Example 4

Figure 5:
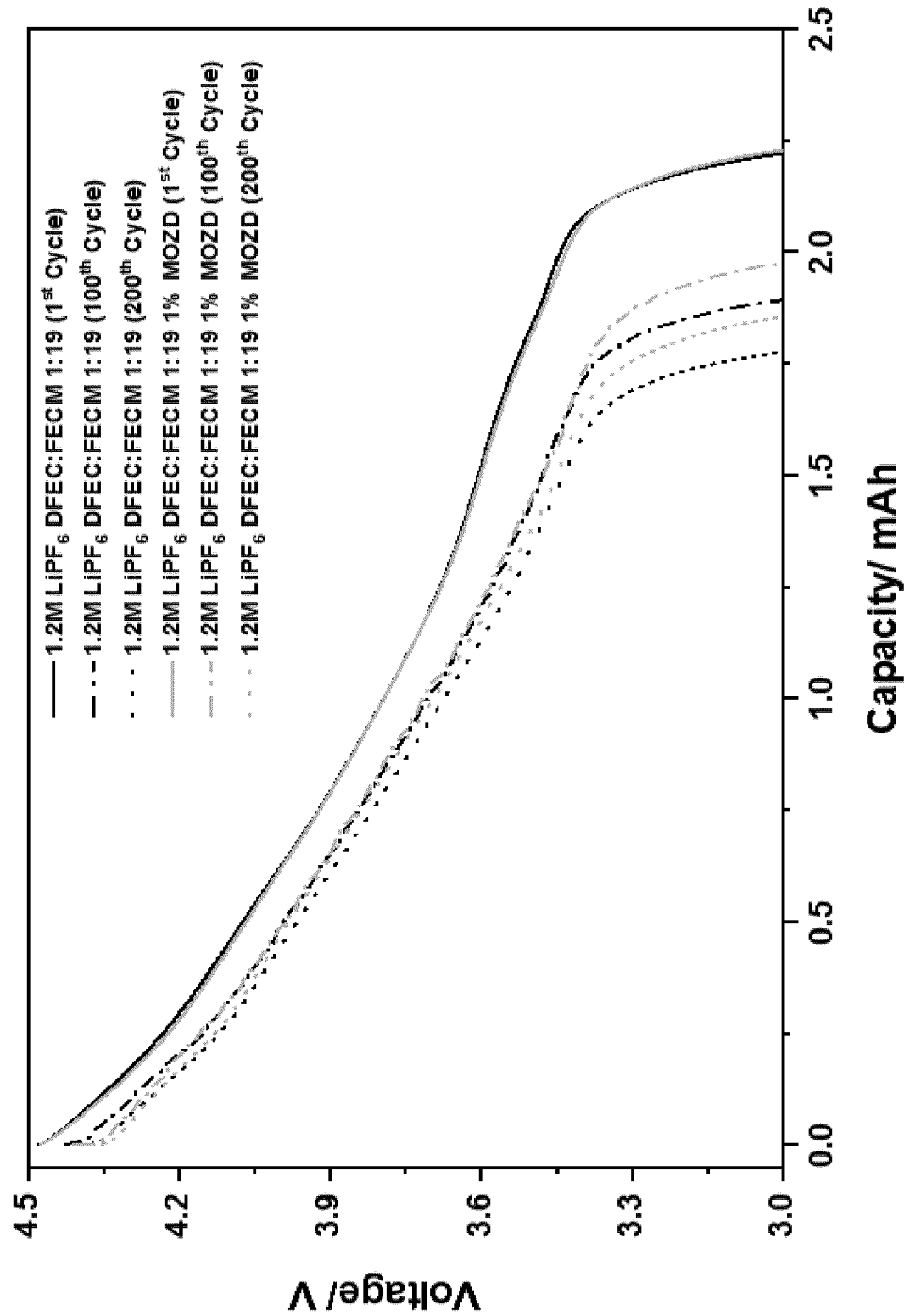
FIG. 5 is the discharge voltage profiles of the $1^{st}$, $100^{th}$, and $200^{th}$ cycles, for cells based on $LiNi_{0.6}Mn_{0.2}Co_{0.2}O_2$/A12 graphite, and electrolytes containing 1.2M $LiPF_6$ in a 3:7 (wt/wt) mixture of EC and ethylmethyl carbonate; 1.2M $LiPF_6$ in 1:19 (wt/wt) difluoroethyl carbonate and fluoroethylmethyl carbonate; and 1.2M $LiPF_6$:19 (wt/wt) difluoroethyl carbonate and fluoroethylmethyl carbonate with 1 wt % MOZD, according to Example 4.

FIG. 5 is an illustration for the discharge voltage profiles of the 1$^{st}$, 100$^{th}$, and 200$^{th}$ cycles for coin cells using a LiNi$_{0.6}$Mn$_{0.2}$Co$_{0.2}$O$_2$ cathode, a A12 graphite anode, with the E and F electrolytes from Example 3. The average discharge voltages were very similar for the cells with and without the MOZD at the 1$^{st}$ cycle. However, the average discharge voltage of the MOZD added cell was slightly higher than the average discharge voltage of the cell without at the 100$^{th}$ cycle. And, at 200$^{th}$ cycle, the MOZD added cell demonstrated a significantly higher average discharge voltage than the cell without additive. These results suggest that the addition of MOZD can effectively lower the impedance of cells upon long-term cycling.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:
1. A non-aqueous electrolyte comprising:
a salt; and
a compound of Formula (I), Formula (II), Formula (III), or a mixture of any two or more thereof:

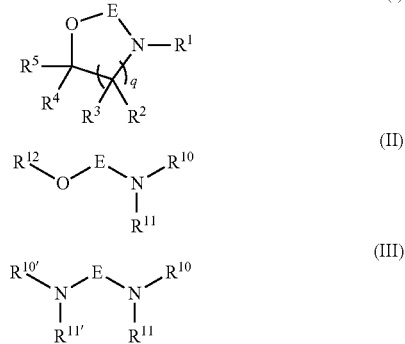

wherein:
E is —S(O)$_2$— or —S(O)—;
R$^1$ is H, F, —OR$^6$, alkyl, alkenyl, aryl, aralkyl, heteroaryl, heteroarylalkyl, heterocyclylalkyl, heterocyclylalkyl, cycloalkyl, cycloalkylalkyl, silyl, siloxy, an ether, a polyalkylene glycol, —CFH$_2$, —CF$_2$H, —CF$_3$, —CF$_2$CF$_3$, —CF$_2$CHF$_2$, —CF$_2$CH$_3$, —CF$_2$CH$_2$F, —CHFCF$_3$, —CHFCHF$_2$, —CHFCH$_3$, —CHFCH$_2$F, —CH$_2$CF$_3$, —CH$_2$CHF$_2$, —CH$_2$CH$_2$F, —CF(CF$_3$)$_2$, or —CH(CF$_3$)$_2$;
R$^2$, R$^3$, R$^4$, and R$^5$ are individually H, F, alkyl, alkenyl, aryl, aralkyl, heteroaryl, heteroarylalkyl, heterocyclylalkyl, heterocyclylalkyl, cycloalkyl, cycloalkylalkyl, silyl, siloxy, an ether, a polyalkylene glycol, —CFH$_2$, —CF$_2$H, —CF$_3$, —CF$_2$CF$_3$, —CF$_2$CHF$_2$, —CF$_2$CH$_3$, —CF$_2$CH$_2$F, —CHFCF$_3$, —CHFCHF$_2$, —CHFCH$_3$, —CHFCH$_2$F, —CH$_2$CF$_3$, —CH$_2$CHF$_2$, —CH$_2$CH$_2$F, —CF(CF$_3$)$_2$, or —CH(CF$_3$)$_2$;
R$^6$ is H, —C(O)R$^7$, alkyl, aryl, aralkyl, heteroaryl, heterocyclyl, alkenyl, alkynyl, silyl, siloxy, an ether, a polyalkylene glycol, —CFH$_2$, —CF$_2$H, —CF$_3$, —CF$_2$CF$_3$, —CF$_2$CHF$_2$, —CF$_2$CH$_3$, —CF$_2$CH$_2$F, —CHFCF$_3$, —CHFCHF$_2$, —CHFCH$_3$, —CHFCH$_2$F, —CH$_2$CF$_3$, —CH$_2$CHF$_2$, —CH$_2$CH$_2$F, —CF(CF$_3$)$_2$, or —CH(CF$_3$)$_2$;
R$^7$ is H, alkyl, aryl, aralkyl, heteroaryl, heterocyclyl, alkenyl, alkynyl, silyl, siloxy, an ether, a polyalkylene glycol, —CFH$_2$, —CF$_2$H, —CF$_3$, —CF$_2$CF$_3$, —CF$_2$CHF$_2$, —CF$_2$CH$_3$, —CF$_2$CH$_2$F, —CHFCF$_3$, —CHFCHF$_2$, —CHFCH$_3$, —CHFCH$_2$F, —CH$_2$CF$_3$, —CH$_2$CHF$_2$, —CH$_2$CH$_2$F, —CF(CF$_3$)$_2$, or —CH(CF$_3$)$_2$;
q is 0, 1, or 2;
R$^{10}$, R$^{10'}$, R$^{11}$ and R$^{11'}$ are individually H, F, alkyl, alkenyl, alkynyl, aryl, aralkyl, heteroaryl, heteroarylalkyl, heterocyclylalkyl, heterocyclylalkyl, cycloalkyl, cycloalkylalkyl, silyl, siloxy, an ether, a polyalkylene glycol, —CFH$_2$, —CF$_2$H, —CF$_3$, —CF$_2$CF$_3$, —CF$_2$CHF$_2$, —CF$_2$CH$_3$, —CF$_2$CH$_2$F, —CHFCF$_3$, —CHFCHF$_2$, —CHFCH$_3$, —CHFCH$_2$F, —CH$_2$CF$_3$, —CH$_2$CHF$_2$, —CH$_2$CH$_2$F, —CF(CF$_3$)$_2$, or —CH(CF$_3$)$_2$, or R$^{10}$ and R$^{11}$ or R$^{10'}$ and R$^{11'}$ may join to form a heterocycle with the nitrogen to which they are attached, with the proviso for Formula (III) that at least one of R$^{10}$, R$^{10'}$, R$^{11}$ and R$^{11'}$ is other than H; and
R$^{12}$ is H, —C(O)R$^7$, alkyl, aryl, aralkyl, heteroaryl, heterocyclyl, alkenyl, silyl, siloxy, an ether, a polyalkylene glycol, —CFH$_2$, —CF$_2$H, —CF$_3$, —CF$_2$CF$_3$, —CF$_2$CHF$_2$, —CF$_2$CH$_3$, —CF$_2$CH$_2$F, —CHFCF$_3$, —CHFCHF$_2$, —CHFCH$_3$, —CHFCH$_2$F, —CH$_2$CF$_3$, —CH$_2$CHF$_2$, —CH$_2$CH$_2$F, —CF(CF$_3$)$_2$, or —CH(CF$_3$)$_2$; and
wherein any of the alkyl, aryl, aralkyl, heteroaryl, heterocyclyl, alkenyl, or alkynyl groups are substituted or unsubstituted.

2. The non-aqueous electrolyte of claim 1, wherein the compound is of Formula (I).

3. The non-aqueous electrolyte of claim 1, wherein the compound is of Formula (I); R$^1$ is C$_{1-6}$ alkyl, —(CR$^{20}$$_2$)$_p$O(C$_1$-C$_6$ alkyl), —(CR$^{20}$$_2$)$_p$O(C$_1$-C$_6$ aryl), or —(CR$^{20}$$_2$)$_p$O(C$_1$-C$_6$ aralkyl); R$^2$, R$^3$, R$^4$, and R$^5$ are each H, F, OR$^6$, or C$_{1-6}$ alkyl; each R$^{20}$ is individually H or F; and p is 1, 2, or 3.

4. The non-aqueous electrolyte of claim 1, wherein the compound is of Formula (I); R$^1$ is methyl, ethyl, or benzyl; and R$^2$, R$^3$, R$^4$, and R$^5$ are each H.

5. The non-aqueous electrolyte of claim 1, wherein the compound is of Formula (I); R$^1$ is C$_{1-6}$ fluorinated alkyl, C$_{1-6}$ fluorinated alkenyl, or C$_{1-6}$ fluorinated alkynyl; and R$^2$, R$^3$, R$^4$, and R$^5$ are C$_{1-6}$ fluorinated alkyl or H.

6. The non-aqueous electrolyte of claim 1, wherein the compound is of Formula (I); R$^1$ is —CH$_3$, —CFH$_2$, —CF$_2$H, —CF$_3$, —CH$_2$CH$_3$, —CFHCH$_3$, —CH$_2$CFH$_2$, —CH$_2$CF$_2$H, —CH$_2$CF$_3$, —CFHCH$_3$, —CFHCFH$_2$, —CFHCF$_2$H, —CFHCF$_3$, —CF$_2$CH$_3$, —CF$_2$CFH$_2$, —CF$_2$CF$_2$H, —CF$_2$CF$_3$, —CHCH$_2$, —CFCH$_2$, —CHCFH, —CHCF$_2$, —CFCFH, —CFCF$_2$, —CH$_2$CF$_2$CF$_3$, —CF(CH$_3$)$_2$, —CH$_2$CF$_2$CF$_3$, —CF$_2$CF(CF$_3$)$_2$, —CH$_2$CF$_2$CF$_2$H, —CH$_2$OCF$_3$, —CF$_2$OCF$_3$, —CH$_2$OCF$_2$CF$_2$F, —CH$_2$OCF$_2$CF$_2$CF$_3$, —CF$_2$OCF$_2$CF$_2$CF$_3$, —C$_6$F$_5$, —CH$_2$OC$_6$F$_5$; —CH$_2$CH$_2$CH$_3$, —CH(CH$_3$)$_2$, —CH$_2$CH$_2$(CH$_3$)$_2$, —CH$_2$OCH$_3$, —C$_6$H$_5$, —CH$_2$OC$_6$H$_5$, —CH$_2$OCH$_2$CH$_3$, —CH$_2$OCH(CH$_3$)$_2$, —C(CH$_3$)HOCH$_3$, —CH$_2$CH$_2$OCH$_3$, or —CH$_2$CH$_2$OCH$_2$CH$_3$; and R$^2$, R$^3$, R$^4$, and R$^5$ are individually H, —CH$_3$, —CFH$_2$, —CF$_2$H, —CF$_3$, —CH$_2$CH$_3$, —CFHCH$_3$, —CH$_2$CFH$_2$, —CH$_2$CF$_2$H, —CH$_2$CF$_3$, —CFHCH$_3$, —CFHCFH$_2$, —CFHCF$_2$H, —CFHCF$_3$, —CF$_2$CH$_3$, —CF$_2$CFH$_2$, —CF$_2$CF$_2$H, —CF$_2$CF$_3$, —CHCH$_2$, —CFCH$_2$, —CHCFH, —CHCF$_2$, —CFCFH, —CFCF$_2$, —CH$_2$CF$_2$CF$_3$, —CF(CH$_3$)$_2$, —CH$_2$CF$_2$CF$_3$, —CF$_2$CF(CF$_3$)$_2$, —CH$_2$CF$_2$CF$_2$H, —CH$_2$OCF$_3$, —CF$_2$OCF$_3$, —CH$_2$OCF$_2$CF$_2$F, —CH$_2$OCF$_2$CF$_2$CF$_3$, —CF$_2$OCF$_2$CF$_2$CF$_3$, —C$_6$F$_5$, —CH$_2$OC$_6$F$_5$; —CH$_2$CH$_2$CH$_3$, —CH(CH$_3$)$_2$, —CH$_2$CH$_2$(CH$_3$)$_2$, —CH$_2$OCH$_3$, —C$_6$H$_5$, —CH$_2$OC$_6$H$_5$, —CH$_2$OCH$_2$CH$_3$, —CH$_2$OCH(CH$_3$)$_2$, —C(CH$_3$)HOCH$_3$, —CH$_2$CH$_2$OCH$_3$, or —CH$_2$CH$_2$OCH$_2$CH$_3$.

7. The non-aqueous electrolyte of claim 1, wherein the compound is of Formula (II).

8. The non-aqueous electrolyte of claim 1, wherein the compound is of Formula (II); R$^{10}$ and R$^{11}$ are individually C$_{1-6}$ alkyl, —(CR$^{20}$$_2$)$_p$O(C$_1$-C$_6$ alkyl), —(CR$^{20}$$_2$)$_p$O(C$_1$-C$_6$ aryl), or —(CR$^{20}$$_2$)$_p$O(C$_1$-C$_6$ aralkyl); R$^{12}$ is C$_{1-6}$ alkyl, —(CR²⁰₂)ₚO(C₁-C₆ alkyl), —(CR²⁰₂)ₚO(C₁-C₆ aryl), or —(CR²⁰₂)ₚO(C₁-C₆ aralkyl); each R²⁰ is individually H or F; and p is 1, 2, or 3.

9. The non-aqueous electrolyte of claim 1, wherein the compound is of Formula (II); R¹⁰ and R¹¹ are individually methyl, ethyl, or benzyl; and R¹² is methyl, ethyl, or benzyl.

10. The non-aqueous electrolyte of claim 1, wherein the compound is of Formula (II); R¹⁰ and R¹¹ are individually C₁₋₆ fluorinated alkyl, C₁₋₆ fluorinated alkenyl, or C₁₋₆ fluorinated alkynyl; and R¹² is fluorinated alkyl.

11. The non-aqueous electrolyte of claim 1, wherein the compound is of Formula (II); R¹⁰ and R¹¹ are individually —CH₃, —CFH₂, —CF₂H, —CF₃, —CH₂CH₃, —CFHCH₃, —CH₂CFH₂, —CH₂CF₂H, —CH₂CF₃, —CFHCH₃, —CFHCFH₂, —CFHCF₂H, —CFHCF₃, —CF₂CH₃, —CF₂CFH₂, —CF₂CF₂H, —CF₂CF₃, —CHCH₂, —CFCH₂, —CHCFH, —CHCF₂, —CFCFH, —CFCF₂, —CH₂CF₂CF₃, —CF(CH₃)₂, —CH₂CF₂CF₃, —CF₂CF(CF₃)₂, —CH₂CF₂CF₂H, —CH₂OCF₃, —CF₂OCF₃, —CH₂OCF₂CF₂CF₃, —CH₂OCF₂CF₂CF₃, —CF₂OCF₂CF₂CF₃, —C₆F₅, —CH₂OC₆F₅; —CH₂CH₂CH₂CH₃, —CH(CH₃)₂, —CH₂CH₂(CH₃)₂, —CH₂OCH₃, —C₆H₅, —CH₂OC₆H₅, —CH₂OCH₂CH₃, —CH₂OCH(CH₃)₂, —C(CH₃)HOCH₃, —CH₂CH₂OCH₃, or —CH₂CH₂OCH₂CH₃; and R¹² is —CH₃, —CFH₂, —CF₂H, —CF₃, —CH₂CH₃, —CFHCH₃, —CH₂CFH₂, —CH₂CF₂H, —CH₂CF₃, —CFHCH₃, —CFHCFH₂, —CFHCF₂H, —CFHCF₃, —CF₂CH₃, —CF₂CFH₂, —CF₂CF₂H, —CF₂CF₃, —CHCH₂, —CFCH₂, —CHCFH, —CHCF₂, —CFCFH, —CFCF₂, —CH₂CF₂CF₃, —CF(CH₃)₂, —CH₂CF₂CF₃, —CF₂CF(CF₃)₂, —CH₂CF₂CF₂H, —CH₂OCF₃, —CF₂OCF₃, —CH₂OCF₂CF₂CF₃, —CH₂OCF₂CF₂CF₃, —CF₂OCF₂CF₂CF₃, —C₆F₅, —CH₂OC₆F₅; —CH₂CH₂CH₂CH₃, —CH(CH₃)₂, —CH₂CH₂(CH₃)₂, —CH₂OCH₃, —C₆H₅, —CH₂OC₆H₅, —CH₂OCH₂CH₃, —CH₂OCH(CH₃)₂, —C(CH₃)HOCH₃, —CH₂CH₂OCH₃, or —CH₂CH₂OCH₂CH₃.

12. The non-aqueous electrolyte of claim 1, wherein the compound is of Formula (III).

13. The non-aqueous electrolyte of claim 1, wherein the compound is of Formula (III); R¹⁰, R¹⁰', R¹¹, and R¹¹' are individually C₁₋₆ alkyl, —(CR²⁰₂)ₚO(C₁-C₆ alkyl), —(CR²⁰₂)ₚO(C₁-C₆ aryl), or —(CR²⁰₂)ₚO(C₁-C₆ aralkyl); each R²⁰ is individually H or F; and p is 1, 2, or 3.

14. The non-aqueous electrolyte of claim 1, wherein the compound is of Formula (III); R¹⁰, R¹⁰', R¹¹, and R¹¹' are individually methyl, ethyl, or benzyl.

15. The non-aqueous electrolyte of claim 1, wherein the compound is of Formula (III); and R¹⁰, R¹⁰', R¹¹, and R¹¹' are individually C₁₋₆ fluorinated alkyl, C₁₋₆ fluorinated alkenyl, or C₁₋₆ fluorinated alkynyl.

16. The non-aqueous electrolyte of claim 1, wherein the compound is of Formula (III); and R¹⁰, R¹⁰', R¹¹, and R¹¹' are individually —CH₃, —CFH₂, —CF₂H, —CF₃, —CH₂CH₃, —CFHCH₃, —CH₂CFH₂, —CH₂CF₂H, —CH₂CF₃, —CFHCH₃, —CFHCFH₂, —CFHCF₂H, —CFHCF₃, —CF₂CH₃, —CF₂CFH₂, —CF₂CF₂H, —CF₂CF₃, —CHCH₂, —CFCH₂, —CHCFH, —CHCF₂, —CFCFH, —CFCF₂, —CH₂CF₂CF₃, —CF(CH₃)₂, —CH₂CF₂CF₃, —CF₂CF(CF₃)₂, —CH₂CF₂CF₂H, —CH₂OCF₃, —CF₂OCF₃, —CH₂OCF₂CF₂CF₃, —CH₂OCF₂CF₂CF₃, —CF₂OCF₂CF₂CF₃, —C₆F₅, —CH₂OC₆F₅; —CH₂CH₂CH₂CH₃, —CH(CH₃)₂, —CH₂CH₂(CH₃)₂, —CH₂OCH₃, —C₆H₅, —CH₂OC₆H₅, —CH₂OCH₂CH₃, —CH₂OCH(CH₃)₂, —C(CH₃)HOCH₃, —CH₂CH₂OCH₃, or —CH₂CH₂OCH₂CH₃.

17. The non-aqueous electrolyte of claim 1 further comprising an additive that is vinylene carbonate

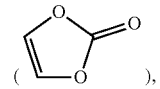

methyl vinylene carbonate

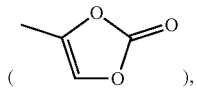

fluoroethylene carbonate, difluoroethylene carbonate, lithium difluoro(oxalato)borate, lithium bis(oxalato)borate, dioxathiolane-2,2-dioxide, ethylene sulfite, 1,3-propane sultone, or dimethyl methyl phosphonate.

18. The non-aqueous electrolyte of claim 1 further comprising a non-aqueous solvent.

19. The non-aqueous electrolyte of claim 1 comprising from greater than 0 wt % up to 20 wt % of the compound, based upon the total weight of the electrolyte.

20. An electrochemical cell comprising:
an anode;
a cathode; and
a non-aqueous electrolyte comprising:
  a salt;
  a non-aqueous solvent; and
  from greater than 0 wt % to about 20 wt % of a compound of Formula (I), Formula (II), Formula (III), or a mixture of any two or more thereof:

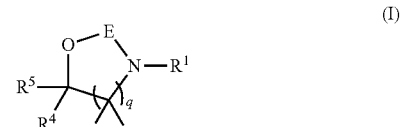
(I)

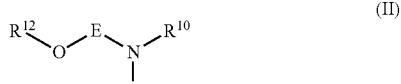
(II)

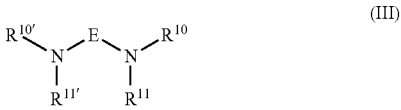
(III)

wherein:
R¹ is H, F, OR⁶, alkyl, alkenyl, aryl, aralkyl, heteroaryl, heteroarylalkyl, heterocyclylalkyl, heterocyclylalkyl, cycloalkyl, cycloalkylalkyl, silyl, siloxy, an ether, a polyalkylene glycol, —CFH₂, —CF₂H, —CF₃, —CF₂CF₃, —CF₂CHF₂, —CF₂CH₃, —CF₂CH₂F, —CHFCF₃, —CHFCHF₂, —CHFCH₃, —CHFCH₂F, —CH₂CF₃, —CH₂CHF₂, —CH₂CH₂F, —CF(CF₃)₂, or —CH(CF₃)₂;

R², R³, R⁴, and Rˢ are individually H, F, alkyl, alkenyl, aryl, aralkyl, heteroaryl, heteroarylalkyl, heterocyclylalkyl, heterocyclylalkyl, cycloalkyl, cycloalkylalkyl, silyl, siloxy, an ether, a polyalkylene glycol, —CFH₂, —CF₂H, —CF₃, —CF₂CF₃, —CF₂CHF₂, —CF$_2$CH$_3$, —CF$_2$CH$_2$F, —CHFCF$_3$, —CHFCHF$_2$, —CHFCH$_3$, —CHFCH$_2$F, —CH$_2$CF$_3$, —CH$_2$CHF$_2$, —CH$_2$CH$_2$F, —CF(CF$_3$)$_2$, or —CH(CF$_3$)$_2$;

R$^6$ is H, —C(O)R$^7$, alkyl, aryl, aralkyl, heteroaryl, heterocyclyl, alkenyl, alkynyl, silyl, siloxy, an ether, a polyalkylene glycol, —CFH$_2$, —CF$_2$H, —CF$_3$, —CF$_2$CF$_3$, —CF$_2$CHF$_2$, —CF$_2$CH$_3$, —CF$_2$CH$_2$F, —CHFCF$_3$, —CHFCHF$_2$, —CHFCH$_3$, —CHFCH$_2$F, —CH$_2$CF$_3$, —CH$_2$CHF$_2$, —CH$_2$CH$_2$F, —CF(CF$_3$)$_2$, or —CH(CF$_3$)$_2$;

R$^7$ is H, alkyl, aryl, aralkyl, heteroaryl, heterocyclyl, alkenyl, alkynyl, silyl, siloxy, an ether, a polyalkylene glycol, —CFH$_2$, —CF$_2$H, —CF$_3$, —CF$_2$CF$_3$, —CF$_2$CHF$_2$, —CF$_2$CH$_3$, —CF$_2$CH$_2$F, —CHFCF$_3$, —CHFCHF$_2$, —CHFCH$_3$, —CHFCH$_2$F, —CH$_2$CF$_3$, —CH$_2$CHF$_2$, —CH$_2$CH$_2$F, —CF(CF$_3$)$_2$, or —CH(CF$_3$)$_2$;

q is 0, 1, or 2;

R$^{10}$, R$^{10'}$, R$^{11}$ and R$^{11'}$ are individually H, F, alkyl, alkenyl, alkynyl, aryl, aralkyl, heteroaryl, heteroarylalkyl, heterocyclylalkyl, heterocyclylalkyl, cycloalkyl, cycloalkylalkyl, silyl, siloxy, an ether, a polyalkylene glycol, —CFH$_2$, —CF$_2$H, —CF$_3$, —CF$_2$CF$_3$, —CF$_2$CHF$_2$, —CF$_2$CH$_3$, —CF$_2$CH$_2$F, —CHFCF$_3$, —CHFCHF$_2$, —CHFCH$_3$, —CHFCH$_2$F, —CH$_2$CF$_3$, —CH$_2$CHF$_2$, —CH$_2$CH$_2$F, —CF(CF$_3$)$_2$, or —CH(CF$_3$)$_2$, or R$^{10}$ and R$^{11}$ or R$^{10'}$ and R$^{11'}$ may join to form a heterocycle with the nitrogen to which they are attached, with the proviso for Formula (III) that at least one of R$^{10}$, R$^{10'}$, R$^{11}$ and R$^{11'}$ is other than H; and R$^{12}$ is H, —C(O)R$^7$, alkyl, aryl, aralkyl, heteroaryl, heterocyclyl, alkenyl, alkynyl, silyl, siloxy, an ether, a polyalkylene glycol, —CFH$_2$, —CF$_2$H, —CF$_3$, —CF$_2$CF$_3$, —CF$_2$CHF$_2$, —CF$_2$CH$_3$, —CF$_2$CH$_2$F, —CHFCF$_3$, —CHFCHF$_2$, —CHFCH$_3$, —CHFCH$_2$F, —CH$_2$CF$_3$, —CH$_2$CHF$_2$, —CH$_2$CH$_2$F, —CF(CF$_3$)$_2$, or —CH(CF$_3$)$_2$; and wherein any of the alkyl, aryl, aralkyl, heteroaryl, heterocyclyl, alkenyl, or alkynyl groups are substituted or unsubstituted.

\* \* \* \* \*